(12) United States Patent
Nose

(10) Patent No.: US 9,594,651 B2
(45) Date of Patent: Mar. 14, 2017

(54) PARALLEL COMPUTER SYSTEM AND CONTROL METHOD FOR PARALLEL COMPUTER SYSTEM

(71) Applicant: FUJITSU LIMITED, Kawasaki-shi, Kanagawa (JP)

(72) Inventor: Takafumi Nose, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 14/797,216

(22) Filed: Jul. 13, 2015

(65) Prior Publication Data

US 2016/0041890 A1    Feb. 11, 2016

(51) Int. Cl.
*G06F 11/00* (2006.01)
*G06F 11/20* (2006.01)
*H04L 12/707* (2013.01)

(52) U.S. Cl.
CPC ........ *G06F 11/203* (2013.01); *G06F 11/2041* (2013.01); *H04L 45/22* (2013.01)

(58) Field of Classification Search
CPC ............... G06F 11/202; G06F 11/2023; G06F 11/2028; G06F 11/203; G06F 11/2041; H04L 45/22
See application file for complete search history.

(56) References Cited

U.S. PATENT DOCUMENTS 5,181,017 A * 1/1993 Frey, Jr. .................. H04L 45/06
340/2.1
2005/0246569 A1   11/2005 Ballew et al.
2008/0186853 A1 * 8/2008 Archer .................. H04L 45/02
370/235
2009/0046727 A1 * 2/2009 Towles .................. H04L 45/00
370/397
2015/0195191 A1 * 7/2015 Inoue ................ G06F 15/17362
709/239

FOREIGN PATENT DOCUMENTS

JP       6-266684       9/1994
JP       2007-533031    11/2007
WO       2005-106668    11/2005

OTHER PUBLICATIONS

Y. Ajima et al., "Tofu: Interconnect for the K computer", Fujitsu 63, No. 3, pp. 260-264, May 2012 (5 pages), with English Abstract. English translation published as: Y. Ajima et al., "Tofu: Interconnect for the K computer", Fujitsu Sci. Tech. J., vol. 48, No. 3, pp. 280-285 (6 pages), Jul. 2012.

* cited by examiner

*Primary Examiner* — Michael Maskulinski
(74) *Attorney, Agent, or Firm* — Fujitsu Patent Center

(57) ABSTRACT

A parallel computer system includes a parallel computer including nodes connected via communication routes and respectively executing calculations, and a control device to allocate a job to a predetermined number of nodes. The control device includes a job allocation processor to allocate, to a peripheral region of first N-dimensional job nodes allocated with a first job, any of an empty node, a zero-dimensional job node, and a node at a side or a surface with one node length of M-dimensional job nodes, N=<1 and M<N, and a failure processor to, when a failure occurs in the first N-dimensional job nodes, allocate at least one node among the nodes in the peripheral region to a relay node, select a route passing through the relay node as an alternative route for a route with the failure, and execute communication among the nodes via the alternative route.

12 Claims, 20 Drawing Sheets

PARALLEL COMPUTER SYSTEM AND CONTROL METHOD FOR PARALLEL COMPUTER SYSTEM

CROSS-REFERENCE TO RELATED APPLICATION

This application is based upon and claims the benefit of priority of the prior Japanese Patent Application No. 2014-160057, filed on Aug. 6, 2014, the entire contents of which are incorporated herein by reference.

FIELD

The present invention relates to a parallel computer system and a control method for the parallel computer system.

BACKGROUND

A computer system that performs a high-performance calculation includes a node connection network in which a plurality of processors called nodes are connected by links. The plurality of nodes allocated with a job such as calculation processing perform processing in parallel while communicating with one another. The parallel computer system has higher performance as the number of processors increases. At the same time, it is more likely that a failure occurs somewhere in the system.

As failures in a parallel computer system in which a large number of processors are connected by links, there are failures of the processors and memories in nodes, failures of routers in the nodes, and disconnection of the links that connect the nodes. When a failure occurs somewhere during job execution, some measures need to be taken because execution of a job being executed in a region including a failure location and a job executed using a communication route passing the failure location is hindered.

Japanese Translation of PCT Application No. 2007-533031 and Japanese Patent Application Laid-Open No. H06-266684 describe processing for, when a node failure occurs, stopping a job of a subset including the failed node, allocating a node to the job anew, and executing the job, processing for securing a channel for avoiding a failure route when a communication route among processors fails, and interconnect of a parallel computer system.

SUMMARY

When an occurred failure is a failure of a router or a failure of a link, a communication route among nodes is interrupted. In that case, if an alternative route replacing the interrupted communication route can be established, a job can be continuously executed regardless of the failure.

However, it may be sometimes impossible to establish the alternative router because of limitation of a hardware routing. By increasing the number of nodes to which a job is allocated and increasing a region size of a node group, it is possible to allocate a job to another node and resume the job. However, in a direct network such as mesh or torus, in general, a node group of a job is allocated in a dense form such as a rectangle or a rectangular parallelepiped. Therefore, when the size is increased without deforming the rectangle or the rectangular parallelepiped, an excessive number of nodes need to be added. This is sometimes against efficiency of the nodes.

One aspect of embodiment is a parallel computer system comprising:

a parallel computer including nodes connected via communication routes and configured to respectively execute calculations; and a control device configured to allocate a job to a predetermined number of nodes in the parallel computer, wherein the control device includes:

a job allocation processor configured to allocate, to a peripheral region of first N-dimensional job nodes allocated with a first job, any of an empty node not allocated with a job, a zero-dimensional job node allocated with a job, and a node at a side or a surface with one node length of M-dimensional job nodes allocated with a job, N being equal to or greater than 1 and M being less than N; and a failure processor configured to, when a failure occurs in the first N-dimensional job node, allocate at least one node among the nodes in the peripheral region to a relay node, select a route passing through the relay node as an alternative route for a communication route in which communication is hindered by the failure, and execute communication among the nodes via the alternative route.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
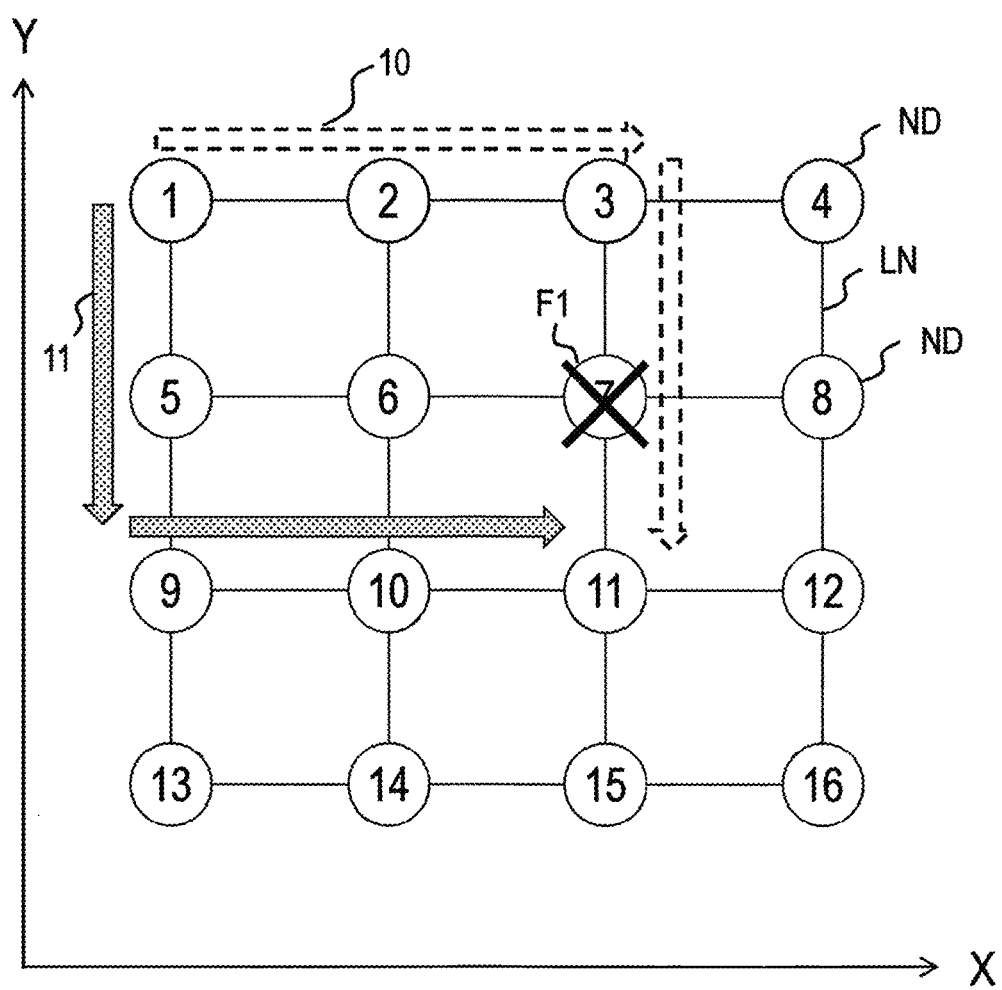
FIG. 1 is a diagram for explaining a first routing example of message transmission of a parallel computer.

FIG. 1 is a diagram for explaining a first routing example of message transmission of a parallel computer. The parallel computer depicted in FIG. 1 is configured by the topology of a two-dimensional mesh and includes a plurality of nodes ND that executes calculation and a plurality of links LN that respectively connect nodes. Each of the nodes ND includes a processor, a memory, and a router. A control device not depicted in the figure allocates a job, which is to be processed, to a predetermined number of nodes and controls execution of the job. The processors of the plurality of nodes allocated with the job process the job in parallel while exchanging messages with one another via links LN.

The routing of FIG. 1 is, as an example, dimension-order routing. According to the dimension-order routing, a shortest route from a start node to an end node is determined under a limitation of a rule that the routing proceeds in an X-axis direction first and proceeds in a Y-axis direction next. According to this rule, when the routing proceeds in the Y-axis direction first, the routing may be unable to proceed in the X-axis direction next. Note that, when the parallel computer is configured by a three-dimensional mesh, a route by the dimension-order routing is determined under a limitation of a rule that the routing proceeds in the X-axis direction first, proceeds in the Y-axis direction next, and finally proceeds in a Z-axis direction.

In FIG. 1, a communication route from a node with a number 1 to a node with a number 11 is configured by, as indicated by a broken line arrow 10, a route in the X-axis direction from the node with the number 1 to a node with a number 3 and a route in the Y-axis direction from the node with the number 3 to the node with the number 11. However, when a router of a node with a number 7 fails, the communication route in the Y-axis direction from the node with the number 3 to the node with the number 11 is interrupted. In this case, a communication route indicated by a solid line arrow 11 is a route bypassing a failure location F1. However, the communication route 11 may be unable to be used because the communication route is against the dimension-order routing. Therefore, it may be impossible to transmit a message packet from the node with the number 1 to the node with the number 11 bypassing the failure location F1. A job being executed has to be stopped. The job has to be allocated to another node group and resumed from the beginning. This causes deterioration in efficiency of use of calculation resources.

Figure 2:
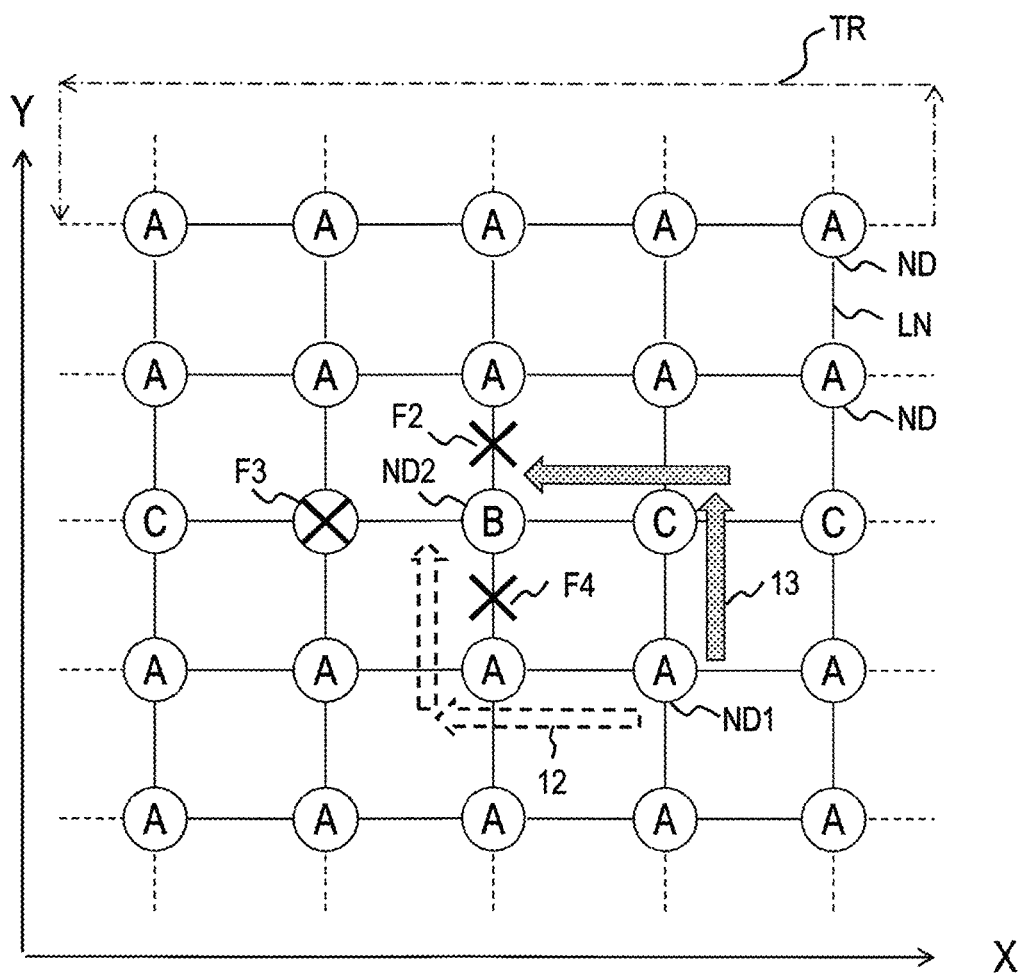
FIG. 2 is a diagram for explaining a second routing example of message transmission of a parallel computer.

FIG. 2 is a diagram for explaining a second routing example of message transmission of a parallel computer. The parallel computer depicted in FIG. 2 is configured by the topology of two-dimensional torus and is configured by a plurality of nodes ND and a plurality of links LN that connect the nodes ND. Links in the X-axis direction include links TR of torus that connects a node at the right end and a node at the left end for every rows. Similarly, links in the Y-axis direction include links of torus for every columns, but not depicted.

The routing of FIG. 2 is, as an example, a West-First-Turn routing. In this case, a shortest route from a start node to an end node is determined under a limitation of a rule that a route in the west direction has to be the first. A communication route from a node ND1 to a node ND2 includes, as indicated by a broken line arrow 12, a route in the west direction first and a route in the north direction next. However, when failures occur in two places of failure spots F2 and F4 and a router of a node in a failure location F3 fails, the communication route from the node ND1 to the node ND2 is interrupted. This is because, since an alternative route indicated by a solid line arrow 13 includes a route in the west direction after a route in the north direction, the communication route is against a rule of West-First-Turn routing. That is, a route from a node C to a node B is not interrupted by occurrence of three failure locations F2 to F4. However, an alternative route from a plurality of nodes A to the node B may be unable to be used. Therefore, it may be impossible to transmit messages among these nodes. A job being executed has to be stopped. The job has to be allocated to other nodes and resumed.

Figure 3:
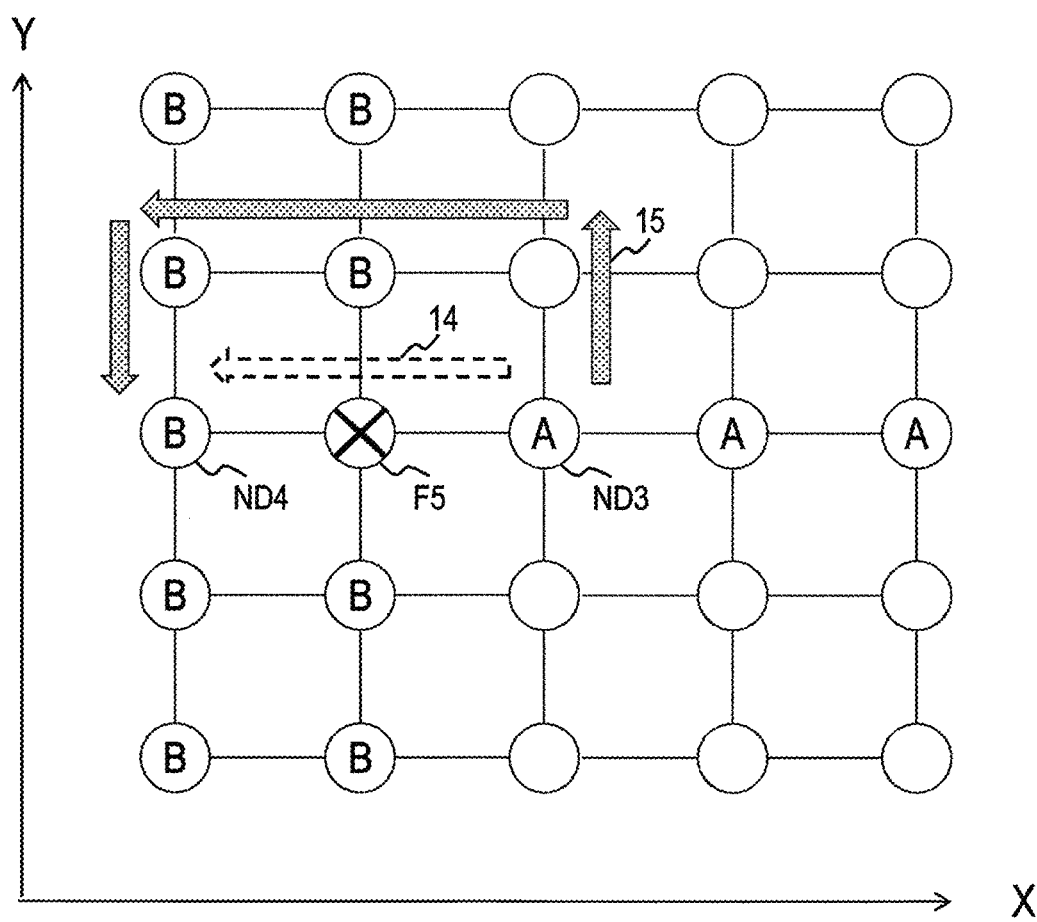
FIG. 3 is a diagram for explaining a third routing example of message transmission of a parallel computer.

FIG. 3 is a diagram for explaining a third routing example of message transmission of a parallel computer. The parallel computer is configured by the topology of a two-dimensional mesh. The routing of FIG. 3 is West-First-Turn routing. Since the topology is not torus, when a router of a node in a failure location F5 fails, a communication route 14 from a node ND3 to a node ND4 is interrupted. An alternative route indicated by a solid line arrow 15 is unable to be used because the alternative route is against the West-First-Turn routing. Eventually, when a route passing the failure location F5 is interrupted, communication routes from a plurality of nodes A to a plurality of nodes B are unable to be used. As a result, a job being executed has to be stopped. The job has to be allocated to another node and resumed from the beginning. In general, in the case of the two-dimensional mesh, it is more difficult to select an alternative route because of occurrence of a failure than in the case of the two-dimensional torus.

Figure 4:
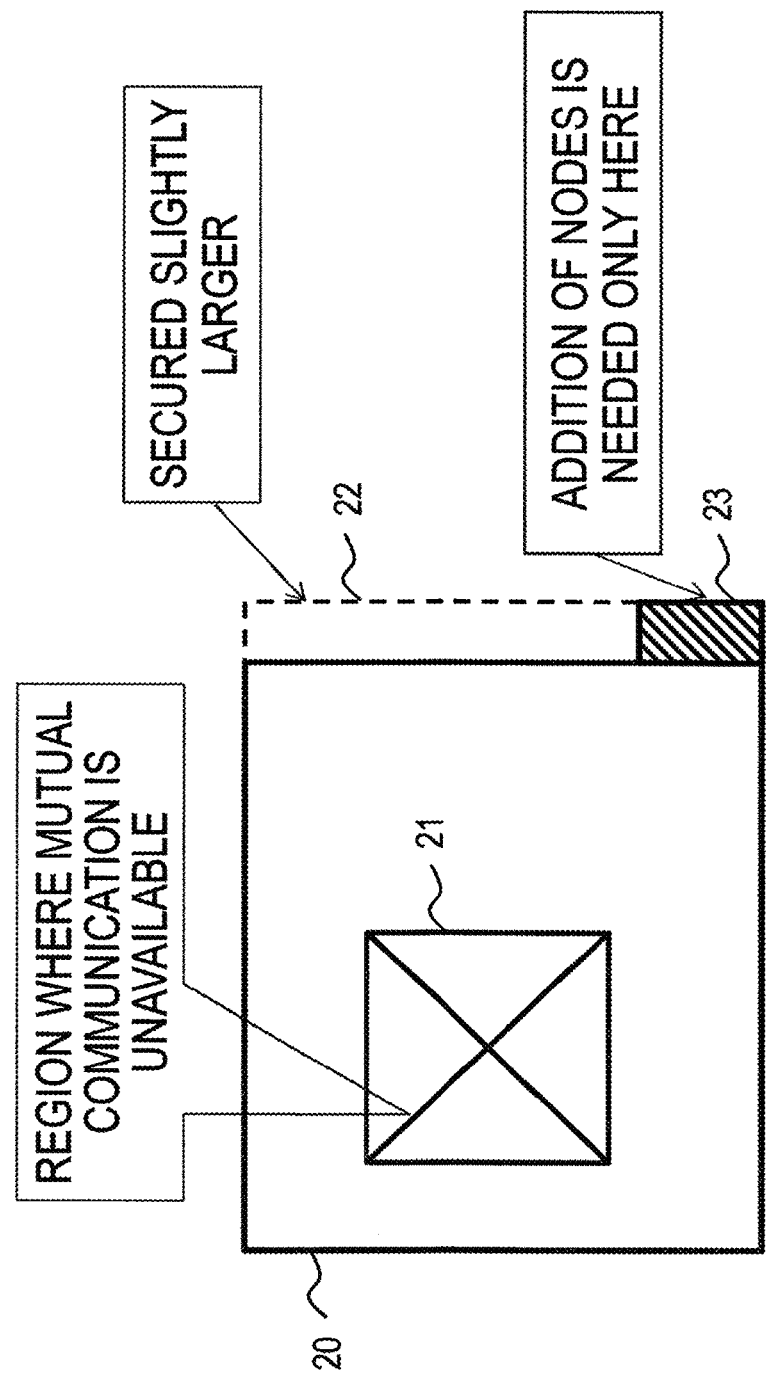
FIG. 4 is a diagram for explaining extension of a region of a plural node group.

FIG. 4 is a diagram for explaining extension of a region of a plural node group. As explained above, when a failure occurs and there is no route bypassing the failure location, a region of a node group allocated with a job needs to be extended. A stopped job needs to be allocated to a node added by the extension. However, when jobs are allocated to a plurality of nodes, in order to avoid interference among the jobs, a node group allocated with the job is preferably a dense shape such as a rectangle or a rectangular parallelepiped.

In FIG. 4, when a certain job is allocated to a plural node region 20, it is assumed that mutual communication is unavailable in a region 21. In this case, a job executed in a node of the region 21 is stopped. The plural node region 20 is extended to a plural node region 22. The extended plural node region 22 is extended while maintaining a rectangle of the original plural node region 20. However, the number of nodes of a node group 23 to which the stopped job is allocated is sometimes smaller than the number of nodes increased by the extension. As a result, only a part of the nodes increased by the extension is used. This causes deterioration in efficiency of calculation resources.

Even if a failure occurs in a node region allocated with a job as explained above, it is desired to prevent deterioration in efficiency of calculation resources while increasing possibility of selection of an alternative route.

[Parallel Computer System in this Embodiment]

Figure 5:
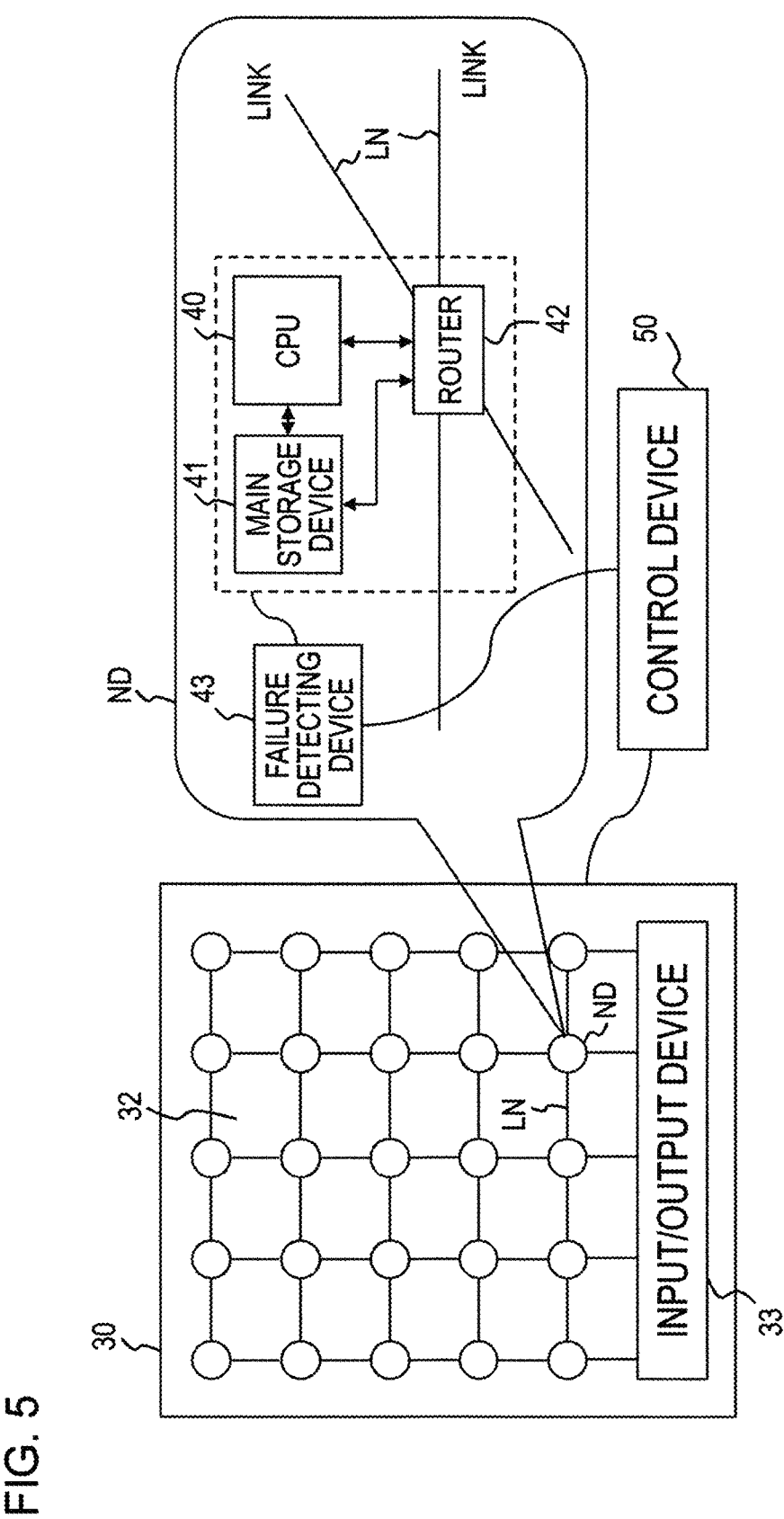
FIG. 5 is a diagram depicting the configurations of a parallel computer system and a node in this embodiment.

FIG. 5 is a diagram depicting the configurations of a parallel computer system and a node in this embodiment. The parallel computer system includes a parallel computer 30 including a plurality of nodes ND that executes calculation and a plurality of links LN that respectively connects the nodes and a control device 50 that allocates a job to the nodes ND in the parallel computer and controls execution of the job. The parallel computer 30 includes a node connection network 32 formed by the plurality of nodes ND and the links LN and an input/output device 33 including a storage.

The node ND includes a CPU 40, which is a processor, a main storage device 41, and a router 42. The processor 40 is, for example, a multi-core processor including a plurality of CPU cores. A failure detecting device 43 that detects a failure state of a node is provided in the node ND. Therefore, a job is allocated to the processor 40 in the node ND. The processor 40 allocated with the job executes arithmetic processing of the job.

The processor 40 executes calculation and processes a job in parallel while exchanging messages with processors of the other nodes. When the node is a start node of message communication, the router 42 transmits a message to any of the links LN on the basis of a routing rule. When the node is a via node through which the message is transmitted, the router 42 routes a message propagated from a certain link LN to the next node on the basis of the routing rule with reference to an end coordinate in a header of the message and additional information needed for the routing.

The processor 40 of the node executes the allocated job. When transmitting a message, the processor 40 of the node generates, in the memory, a message packet in which a start coordinate and an end coordinate is stored in a header. The router 42 transmits the message packet on the basis of the routing rule. When the processor 40 receives the message packet, if the end coordinate in the header is a coordinate of the processor 40, the processor 40 buffers the message packet in the memory and executes requisite processing. Further, the router 42 of the node routes the packet to a transfer destination based on the routing rule with reference to the start coordinate and the end coordinate in the header of the received message packet.

Therefore, when the node fails, and when the processor 40 fails, execution processing of the job by the node is disabled. The node may be unable to function as a start node and transmit the message packet, and function as an end node and receive the message packet. When the router 42 fails, transmission and reception of a packet may be unable to be transmitted and received. Transfer of the packet may be unable to be performed. When a link fails, for example, is disconnected, transmission of a packet through the link may be unable to be performed.

Figure 6:
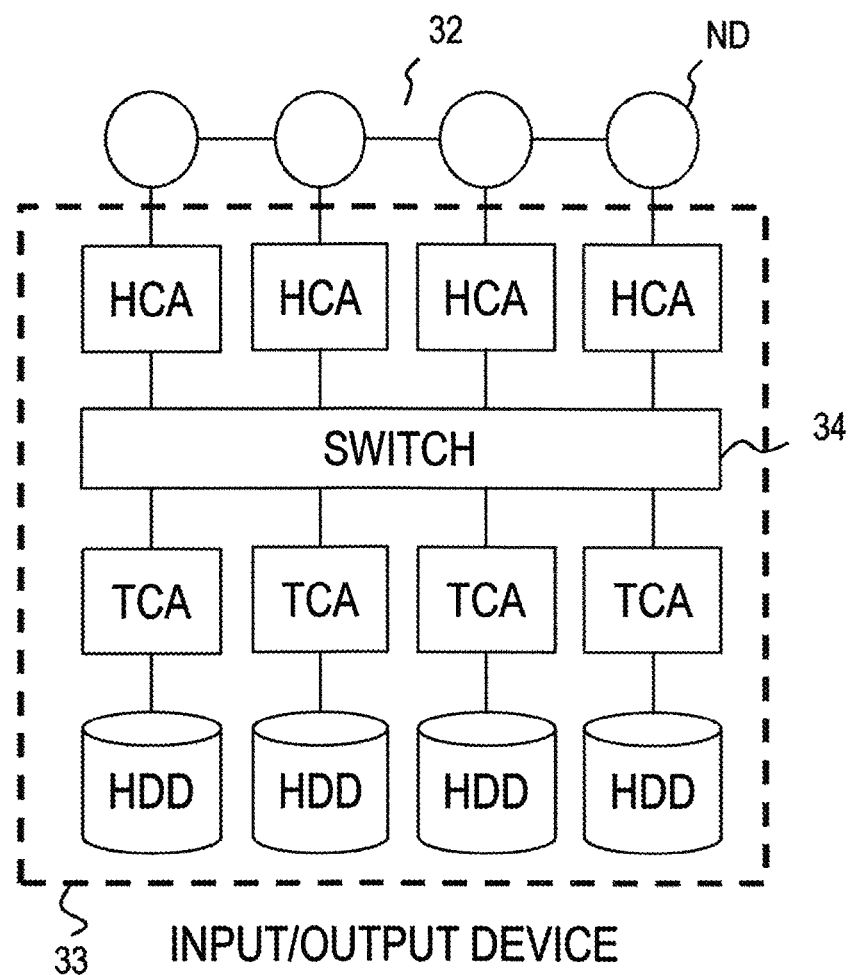
FIG. 6 is a configuration diagram of an input/output device 33 in the parallel computer.

FIG. 6 is a configuration diagram of an input/output device 33 in the parallel computer. The input/output device 33 includes a plurality of large-capacity storage media such as hard disks HDD. The input/output device 33 includes host channel adapters HCA connected to the node connection network 32, a switch 34, and target channel adapters TCA that connect the switch 34 and the HDDs. The processors of the plurality of nodes in the node connection network 32 are accessible to the large-capacity storage media in the input/output device 33.

Figure 7:
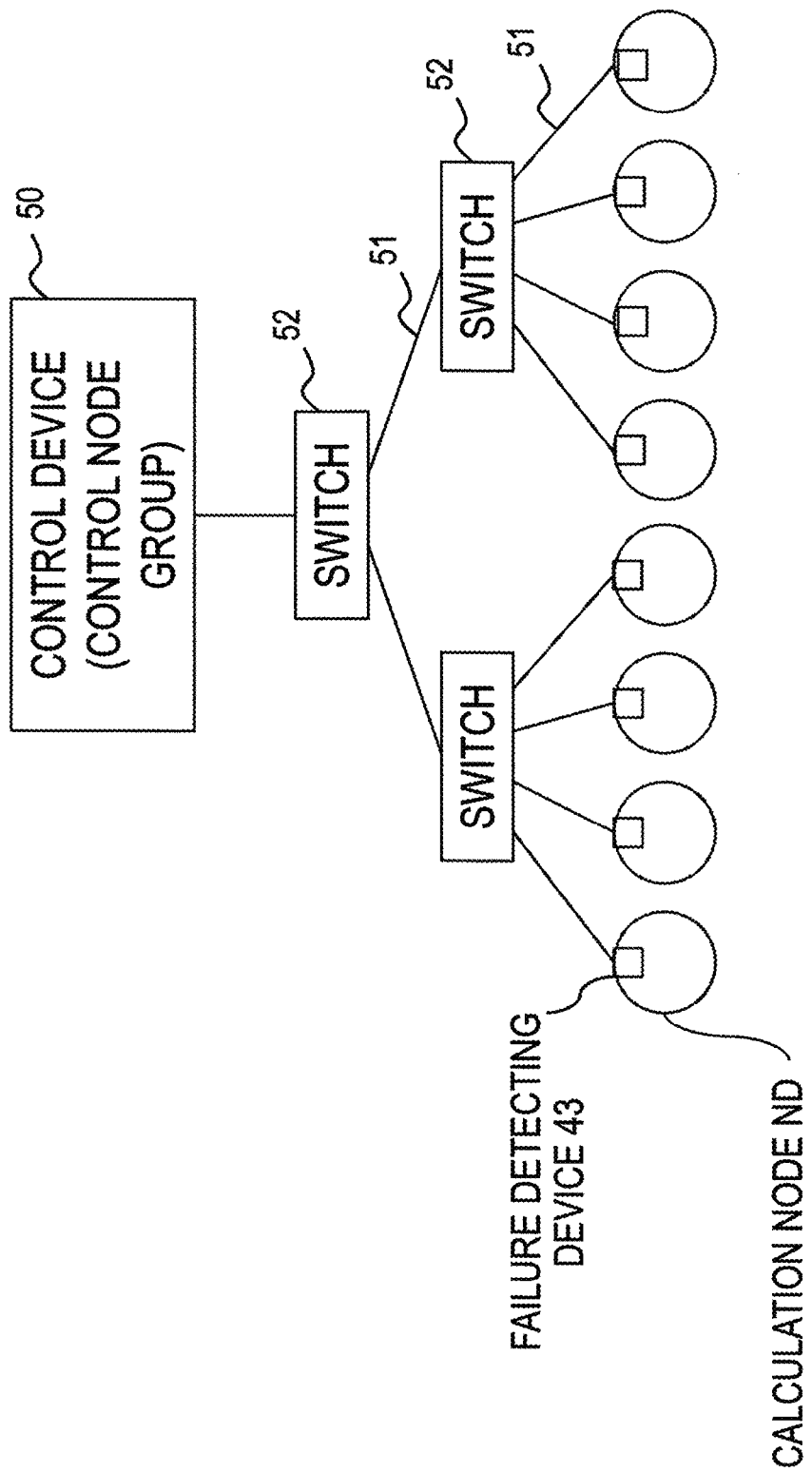
FIG. 7 is a diagram depicting the configuration of the control device of the parallel computer system.

FIG. 7 is a diagram depicting the configuration of the control device of the parallel computer system. The control device 50 is, for example, a server. Like the node connection network 32 of the parallel computer, the control device 50 may be configured by a plurality of nodes and links that connect the nodes. The control device 50 is connected to the plurality of nodes ND in the node connection network 32 of the parallel computer via a network 51 and switch groups 52.

Figure 8:
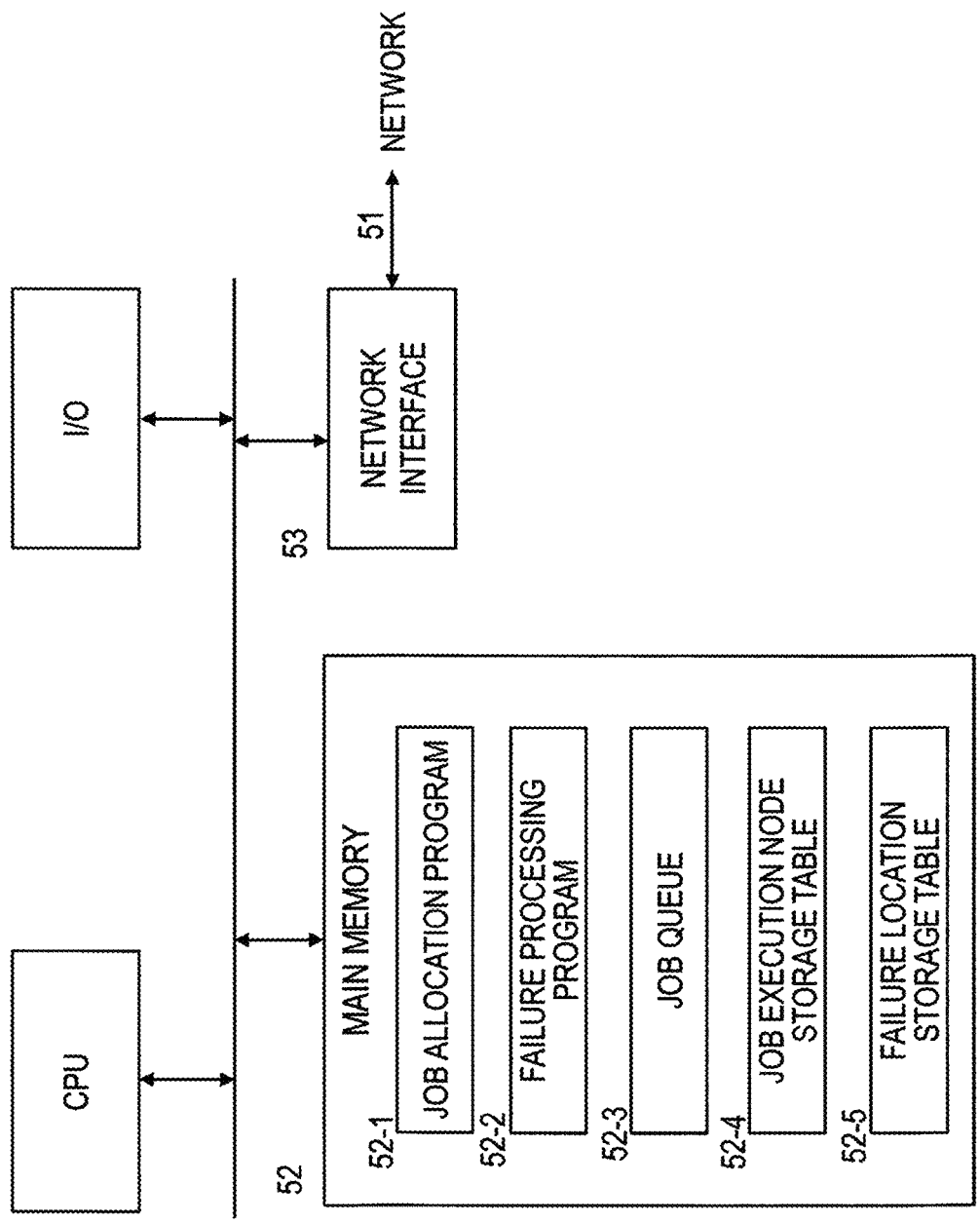
FIG. 8 is a diagram depicting the configuration of the control device 50.

FIG. 8 is a diagram depicting the configuration of the control device 50. The control device 50 is a server device as explained above. The control device 50 includes a CPU, which is a processor, an input/output device I/O, a main memory 52, and a network interface 53, which is an interface with the network 51. In the main memory 52, a job allocation program 52-1 for allocating a job requested by a user to the nodes of the parallel computer and a failure processing program 52-2 for performing failure processing when a failure occurs in the parallel computer are stored. The job allocation program 52-1 and the failure processing program 52-2 are executed by the processor CPU. In the main memory 52, a job queue 52-3 that stores a job requested by the user, a job execution node storage table 52-4 that records a node which is currently executing a job, and a failure location storage table 52-5 that records a failure location are stored.

In response to an execution request for a job from the input/output device I/O by the user, the control device 50 enters the requested job in the job queue 52-3. The processor CPU executes the job allocation program 52-1, allocates a job to a requisite number of nodes of the parallel computer, and controls an execution start of the job. At the same time, the processor CPU registers a node that is currently executing the job in the job execution node storage table 52-4. When receiving a failure detection notification from the failure detecting devices 43 provided in the nodes, the processor CPU executes the failure processing program 52-2, registers a failure location and failure content in the failure location storage table 52-5, and performs failure processing explained below such as a stop and resumption of the job and a search for an alternative route.

[Job Allocation Processing]

In the parallel computer system in this embodiment, in order to increase the possibility of establishment of an alternative route when a hindrance occurs in a communication route because of an occurred failure, the control device allocates a job not allowed to be suspended, that is, a job having high importance, for which continuous execution is requested, to the nodes as explained below.

Figure 9:
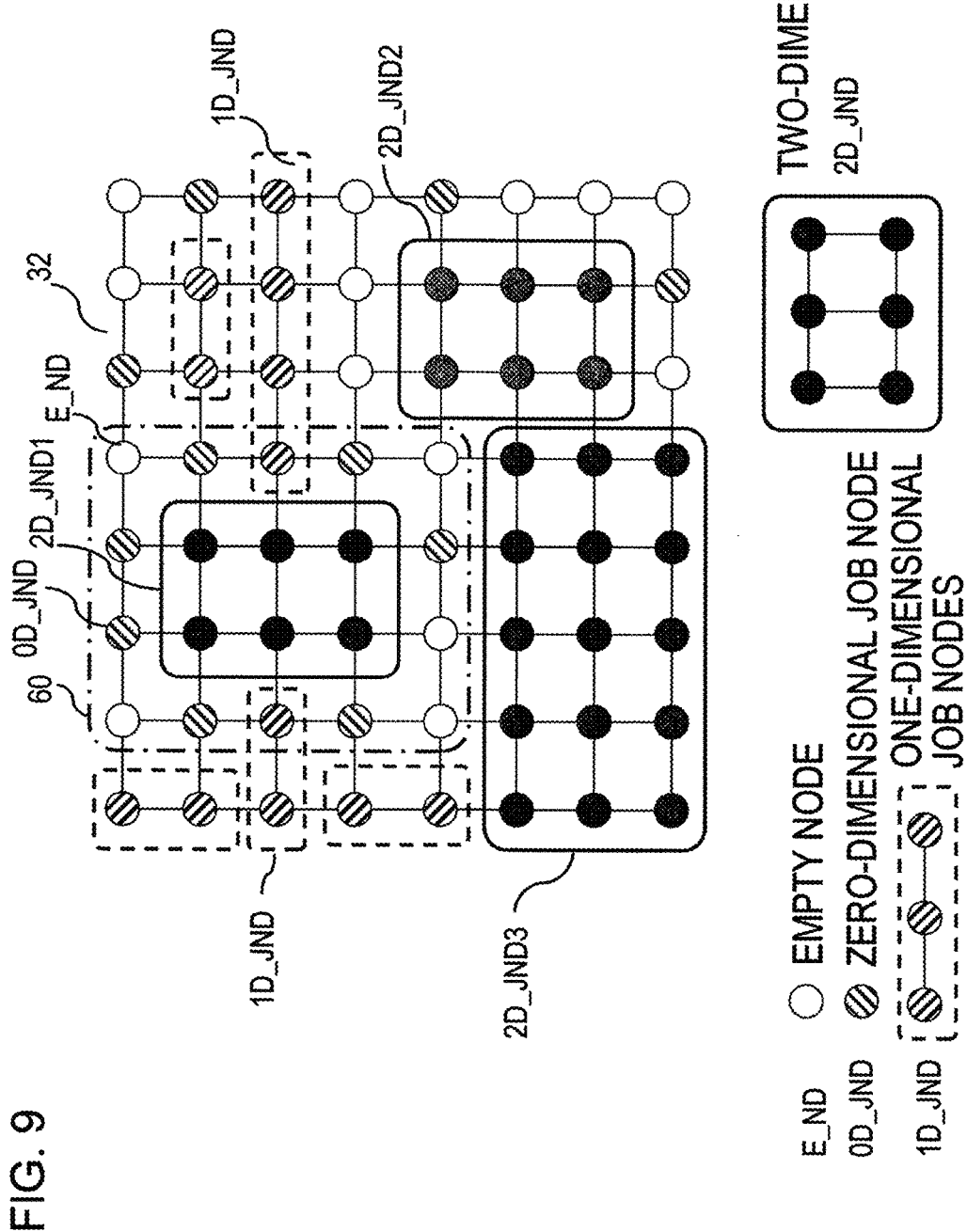
FIG. 9 is a diagram depicting a job allocation example by the control device in this embodiment.

FIG. 9 is a diagram depicting a job allocation example by the control device in this embodiment. In this example, the topology of the node connection network 32 of the parallel computer is two-dimensional mesh of 8×8. Routing is a West-First-Turn model. However, this embodiment can also be applied to various kinds of topology such as any N-dimensional mesh or N-dimensional torus and other routing models such as dimension-order routing.

In FIG. 9, nodes indicated by white circles are nodes to which a job is not allocated and for which the processor does not execute calculation. The nodes are referred to as standby nodes or empty nodes E_ND. Nodes indicated by right upward oblique lines are nodes to each of which a certain job is respectively allocated and in which the job is being executed. The nodes are referred to as zero-dimensional job nodes 0D_JND. Nodes indicated by left upward oblique lines are a plurality of nodes to which a job is allocated and in which the job is being executed and are nodes arranged in a certain one-dimensional direction. The nodes are referred to as one-dimensional job nodes 1D_JND. Further, nodes indicated by black circles are two-dimensionally arranged nodes to which a job is allocated. The nodes are referred to as two-dimensional job nodes 2D_JND.

In the example depicted in FIG. 9, for simplification, the topology is a two-dimensional mesh. Therefore, the two-dimensional job nodes have a maximum number of dimensions. In the case of a three-dimensional mesh, a job is sometimes allocated to three-dimensional job nodes of a maximum dimension. In general, in the case of a K-dimensional mesh, it is possible to allocate a job to zero-dimensional to K-dimensional job nodes.

In the empty node E_ND, a processor is stopped but a router routes a message packet to be propagated. The zero-dimensional job node 0D_JND is executing a job with a single processor. Therefore, the zero-dimensional job node 0D_JND does not transmit and receive a message to and from the processors of the other nodes.

On the other hand, in the one-dimensional job nodes 1D_JND, a plurality of nodes arranged in the one-dimensional direction calculates a job in parallel. Therefore, processors of the plurality of nodes in the one-dimensional job nodes transmit and receive a message to and from one another. In addition to routing a message in the one-dimensional job nodes, a router routes a message among nodes outside the one-dimensional job nodes.

Job allocation processing by the control device in this embodiment is explained. The control device 50 allocates a job requested by the user to a suitable number of nodes for a processing amount of the job. When the job is allocated to a plurality of nodes, in order to avoid interference with other jobs, the job is allocated to nodes in a region having a dense shape such as a rectangle or a rectangular parallelepiped. That is, the job is not allocated to a region having an uneven external shape.

In the example depicted in FIG. 9, the topology is the two-dimensional mesh. Therefore, the shape of the region of the job nodes to which the job is allocated is three kinds, i.e., the zero-dimensional job node 0D_JND, the one-dimensional job nodes 1D_JND, and the two-dimensional job nodes 2D_JND. When the topology is a three-dimensional mesh, three-dimensional job nodes are added. When the topology is an N-dimensional mesh, the job can be allocated up to N-dimensional job nodes.

In FIG. 9, the control device 50 allocates jobs respectively to three two-dimensional job nodes 2D_JND1 to 3. It is assumed that, among the job nodes, an important job, continuous execution of which is requested, is allocated to the two-dimensional job nodes 2D_JND1.

First, the control device 50 allocates any of the empty node E_ND, the zero-dimensional job node 0D_JND, and a node at one end of the one-dimensional job nodes 1D_JND to a peripheral region of the two-dimensional job nodes 2D_JND1 allocated with the important job, that is, a peripheral region between an alternate long and short dash line 60 and the two-dimensional job nodes 2D_JND1. In particular, in the case of the one-dimensional job nodes 1D_JND, the control device 50 allocates the one-dimensional job nodes 1D_JND such that only the node at one end of the one-dimensional shape is adjacent to the two-dimensional job nodes 2D_JND1 of the important job. That is, the control device 50 allocates the one-dimensional job nodes 1D_JND such that the side of the one-dimensional job nodes 1D_JND having one node length is in contact with any of the sides of the two-dimensional job nodes 2D_JND1 of the important job.

In the example depicted in FIG. 9, five empty nodes E_ND, seven zero-dimensional job nodes 0D_JND, and nodes on sides at one ends of two one-dimensional job nodes 1D_JND are allocated to the peripheral region of the two-dimensional job nodes 2D_JND1 of the important job.

The control device 50 allocates the two-dimensional job nodes 2D_JND1 of the important job such that the two-dimensional job nodes 2D_JND1 are adjacent to the two-dimensional job nodes 2D_JND2 and 2D_JND3 allocated with another job respectively, via the region (the peripheral region) between the alternate long and short dash line 60 and the two-dimensional job nodes 2D_JND1. That is, the control device 50 arranges the two-dimensional job nodes 2D_JND1 of the important job not to be directly adjacent to the two-dimensional job nodes 2D_JND2 and 2D_JND3 allocated with the other job.

In this way, the nodes explained above are arranged in the peripheral region of the two-dimensional job nodes 2D_JND1 of the important job. Consequently, when a failure occurs in the two-dimensional job nodes 2D_JND1, it is possible to increase possibility of establishing, using the nodes in the peripheral region, an alternative route replacing a communication route interrupted by the failure. Above all, by allocating a relay node to the empty node E_ND, possibility of establishing a first alternative route from a start node of message communication to the relay node and a second alternative route from the relay node to an end node increases.

The relay node has a relay function of detecting a communication route from a coordinate of the relay node to an end coordinate of a message, generating a message packet, and enabling a start of routing of the message packet. By using the relay node, it is possible to increase possibility of establishing an alternative route avoiding a failure location even under limitation of routing. However, the zero-dimensional job node or the node at one end of the one-dimensional job nodes can be allocated to the relay node, when an operating ratio of a core of a part of the processor in the zero-dimensional job node or the node at one end of the one-dimensional job nodes is zero or low. The relay node and the alternative route are explained in detail below.

Note that, in the example explained above, the important job is allocated to the two-dimensional job nodes 2D_JND1. However, the important job may be allocated to the one-dimensional job nodes. In that case as well, any of the empty node, the zero-dimensional job node, and the node at the side with one node length of the one-dimensional job nodes is allocated to the peripheral region of the one-dimensional job nodes of the important job. In this case, the side of one node length of the one-dimensional job nodes needs to be allocated to be in contact with the one-dimensional job nodes of the important job.

Figure 10:
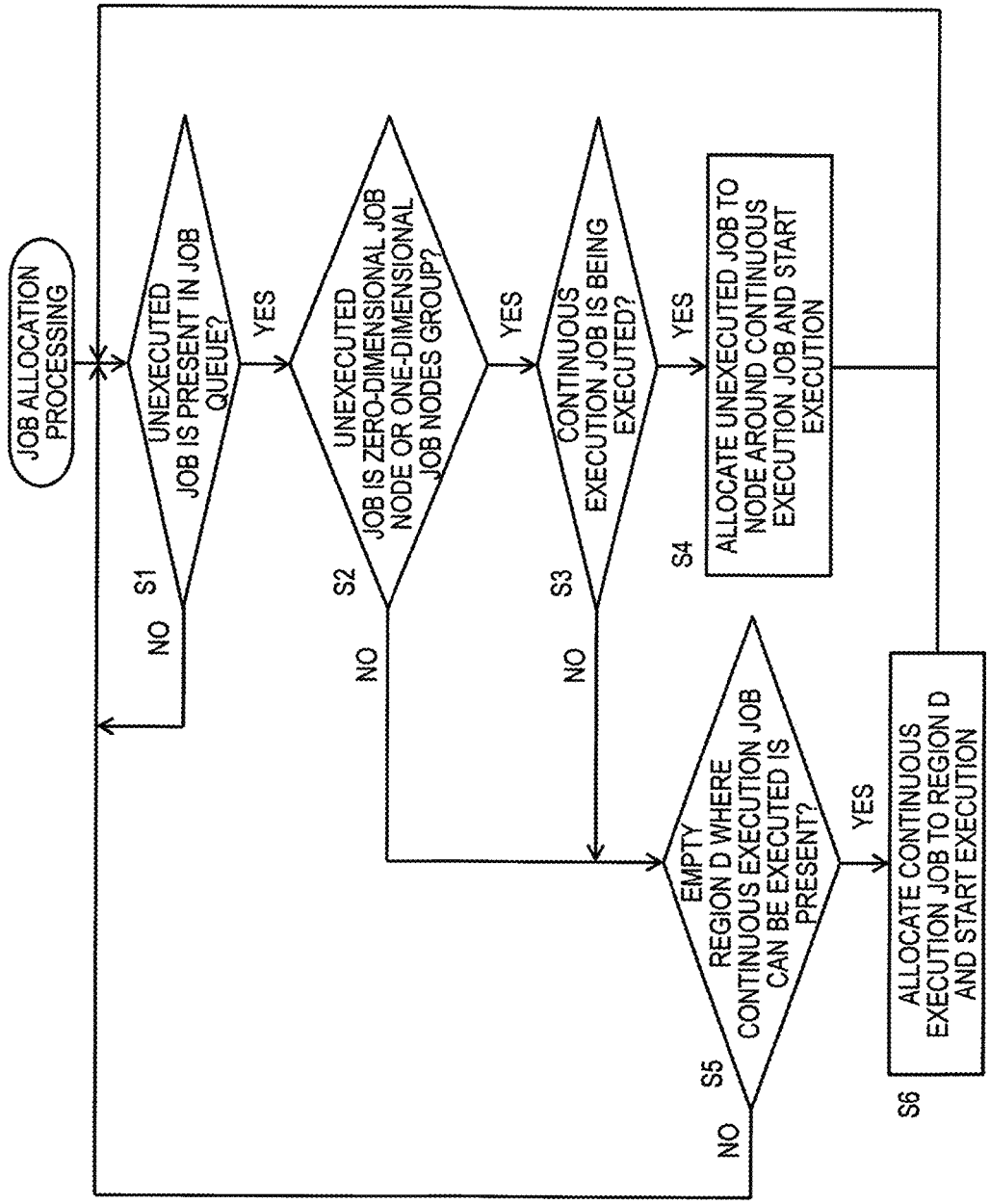
FIG. 10 is a flowchart of job allocation processing by the control device in this embodiment.
Figure 11:
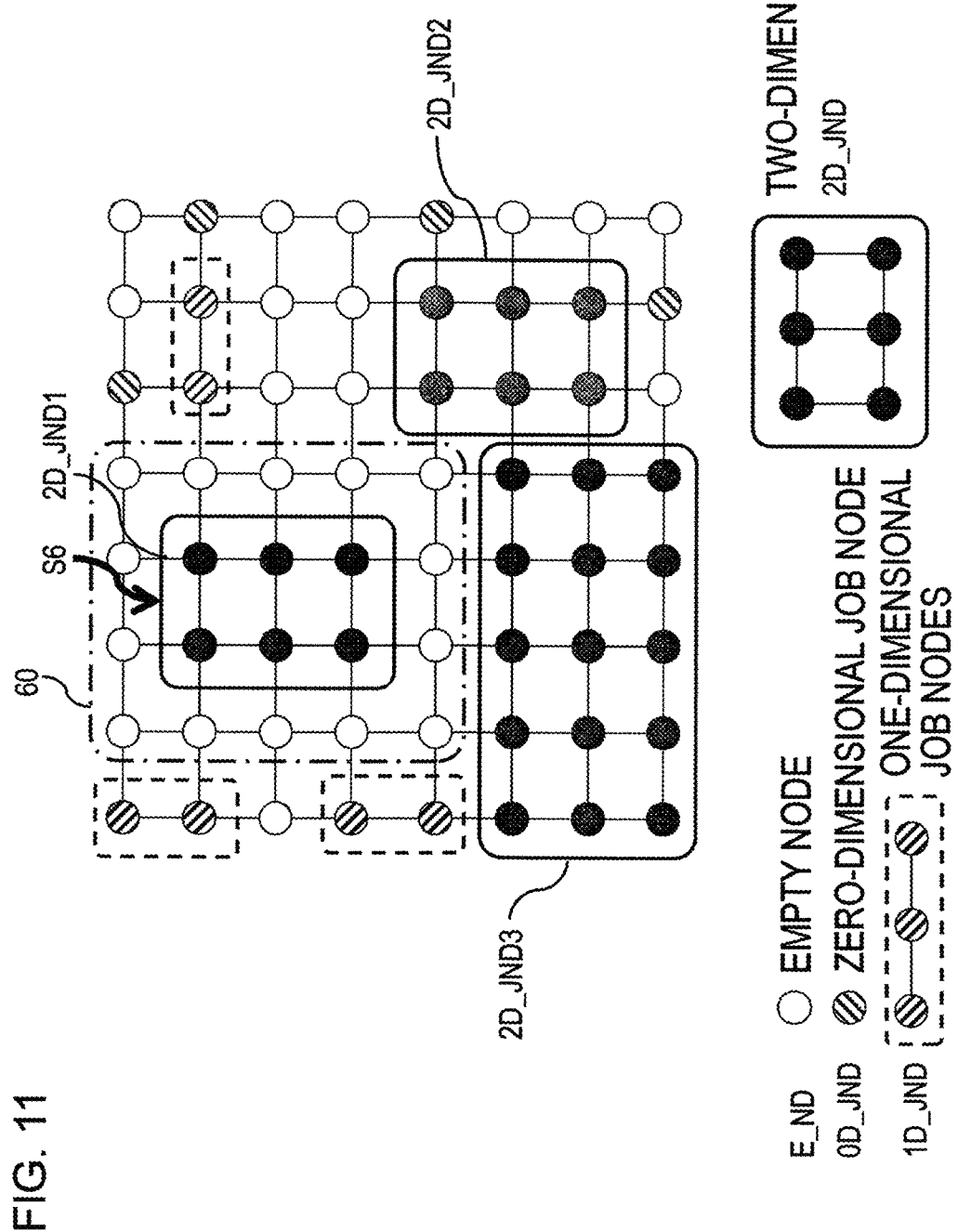
FIG. 11 is a diagram depicting a state halfway in the job allocation processing.

FIG. 10 is a flowchart of job allocation processing by the control device in this embodiment. FIG. 11 is a diagram depicting a state halfway in the job allocation processing. The processor CPU of the control device 50 executes a job allocation program and performs the job allocation processing explained below.

First, the control device 50 checks whether unexecuted job is present in the job queue 52-3 (S1). If the unexecuted job is present (YES in S1), the control device 50 performs the next processing. If the unexecuted job is not allocatable to the zero-dimensional job node or the one-dimensional job nodes (NO in S2), and if the unexecuted job is an important job that needs to be continuously executed and there is an empty region of a node to which the job, which is to be continuously executed, can be allocated (YES in S5), the control device 50 allocates the job, which is to be continuously executed, to the empty region and starts job execution (S6).

FIG. 11 depicts a state in which the job, which is to be continuously executed, is allocated to the region of the two-dimensional job nodes 2D_JND1 in the empty region 60. In this example, the empty region 60 is wider or larger than the region of the two-dimensional job nodes 2D_JND1 by one node in the four directions. That is, the peripheral region of the two-dimensional job nodes 2D_JND1 is secured.

Thereafter, if the unexecuted job is allocatable to the zero-dimensional job node or the one-dimensional job node (YES in S2) and if a job, which is to be continuously executed, is being executed (YES in S3), the control device 50 allocates the unexecuted job to a node in the peripheral region of the two-dimensional job nodes 2D_JND1, allocated with the job to be continuously executed, and causes the node to start execution of the unexecuted job (S4). The control device 50 repeats this processing for allocating the unexecuted job to the node in the peripheral region until the empty nodes E_ND in the peripheral region reaches a minimum number needed. In this way, the allocation of the unexecuted job is repeated. Any of the empty node E_ND, the zero-dimensional job node 0D_JND, and the node at the one end of the one-dimensional job nodes 1D_JND is allocated to the peripheral region of the two-dimensional job nodes 2D_JND1. The allocation is as depicted in FIG. 9. The two-dimensional job nodes 2D_JND1 allocated with the important job is not directly adjacent to the two-dimensional job nodes 2D_JND 2 and 3 allocated with the other job but is adjacent to the two-dimensional job nodes 2D_JND2 and 3 via the peripheral region.

[Failure Processing]

In the parallel computer system in this embodiment, when a hindrance occurs in the communication route because of a failure that occurs in the two-dimensional job nodes of the important job, the control device 50 allocates the relay node to the node in the peripheral region of the two-dimensional job nodes and establishes an alternative route for the interrupted communication route. Possibility of establishing the alternative route for the communication route interrupted by the failure is increased by establishing the alternative route through the relay node in which routing can be resumed with a new packet without being limited by routing.

Figure 12:
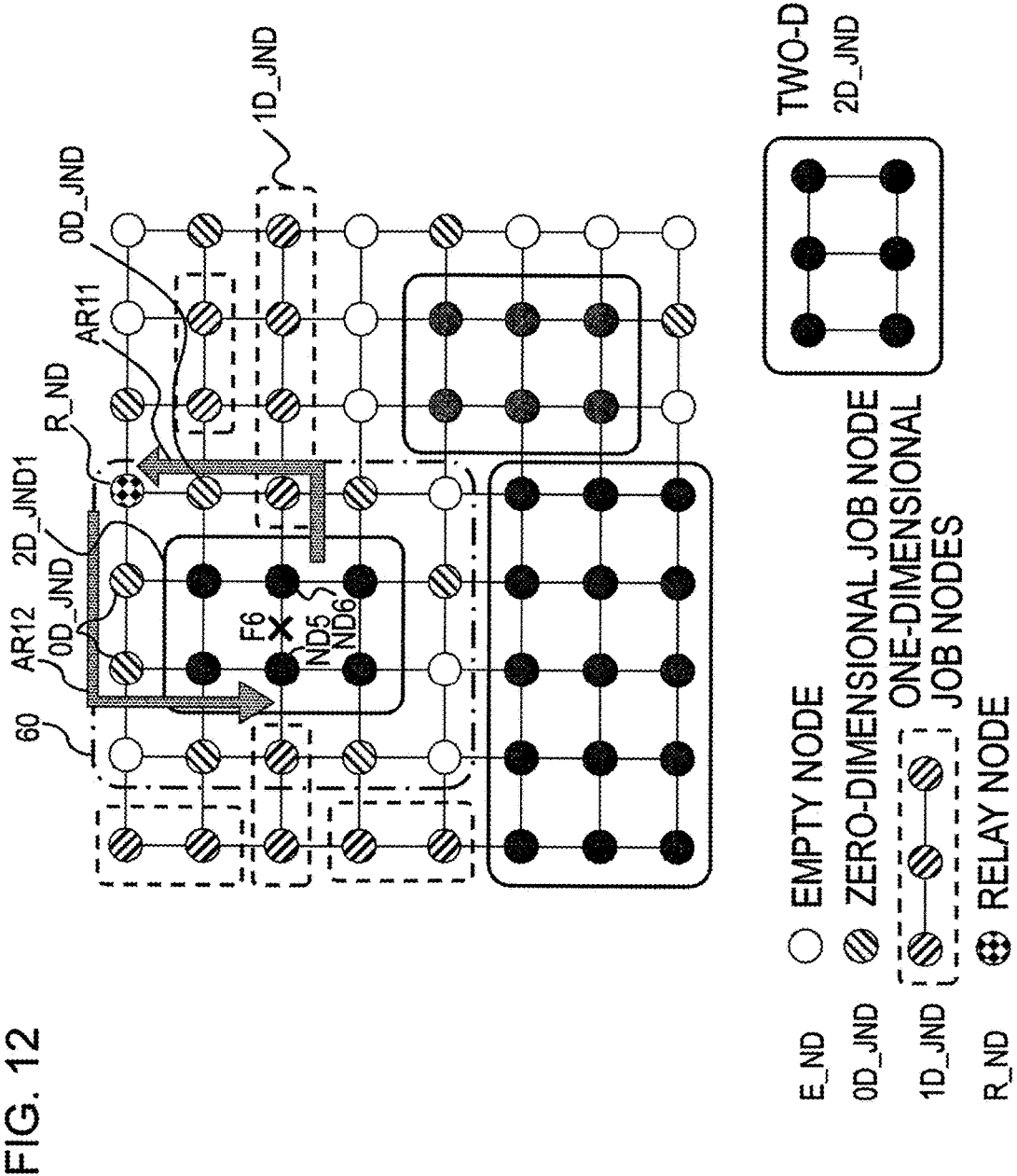
FIG. 12 is a diagram depicting an example of a first alternative route in this embodiment.

FIG. 12 is a diagram depicting an example of a first alternative route in this embodiment. The topology of a node connection network, a routing rule, and allocation of a job in the node connection network in FIG. 12 is the same as those in FIG. 9. As depicted in FIG. 12, it is assumed that a failure F6 occurs in a center link in the two-dimensional job nodes 2D_JND1 allocated with the important job that is to be continuously executed. As a result, in the two-dimensional mesh and the West-First-Turn routing, an alternative route for a communication route from a node ND6 to a node ND5 may be unable to be established in the two-dimensional job nodes 2D_JND1. This is because, as in the example depicted in FIG. 3, although a westward route is needed as the route from the node ND6 to the node ND5, it may be impossible to pass through a westward route from the node ND6 first because of the failure F6.

Therefore, in the failure processing, the control device 50 allocates a relay node R_ND to a node in the peripheral region of the two-dimensional job nodes 2D_JND1, desirably, an empty node. The control device 50 establishes an alternative route including a first alternative route AR11 from the start node ND6 to the relay node R_ND and a second alternative route AR12 from the relay node R_ND to the end node ND5. The control device 50 installs a relay program in the selected relay node R_ND and starts the relay program. Therefore, the relay node R_ND can store a received packet in a buffer and start routing again using the packet as a new packet. As a result, the relay node R_ND can perform routing that proceeds in the west direction first in the second alternative route AR12.

The first alternative route AR11 passes through the node at the side (the side at the left end) with one node length of the one-dimensional job nodes 1D_JND and the zero-dimension job node 0D_JND allocated in the peripheral region until the first alternative route AR11 reaches the relay node R_ND from the start node ND6. However, the node at the left end of the one-dimensional job nodes 1D_JND and in contact with the second-dimensional job nodes 2D_JND1 transmits and receives a message in the one-dimensional job nodes to and from only a node on the right. Therefore, the route of the node at the left end of the one-dimensional job nodes 1D_JND has enough room for routing in directions other than the direction of the node on the right. Therefore, even if the node at the left end of the one-dimensional job nodes 1D_JND is a via node through which the message passes in the first alternative route AR11, there is no problem in the router of the above node performing the routing processing of the alternative route AR11. Further, since the zero-dimensional job nodes 0D_JND is not transmitting a message, the router of the zero-dimensional job node 0D_JND has room for the routing processing. Therefore, even if the zero-dimension job node 0D_JND is the via node in the first alternative route AR11, there is no problem because the zero-dimension job node 0D_JND has enough room for performing the routing processing.

Similarly, the second alternative route AR12 passes through the two zero-dimensional job nodes 0D_JND allocated to the peripheral region until the second alternative route AR2 reaches the end node ND5 from the relay node R_ND. Because of the same reason as explained above, this via node has enough room for performing the routing processing of the second alternative route AR12. Unlike FIG. 12, the second alternative route AR12 may reach the end node ND5 not through a node in the two-dimensional job nodes 2D_JND1 but through only a node in the peripheral region.

Figure 13:
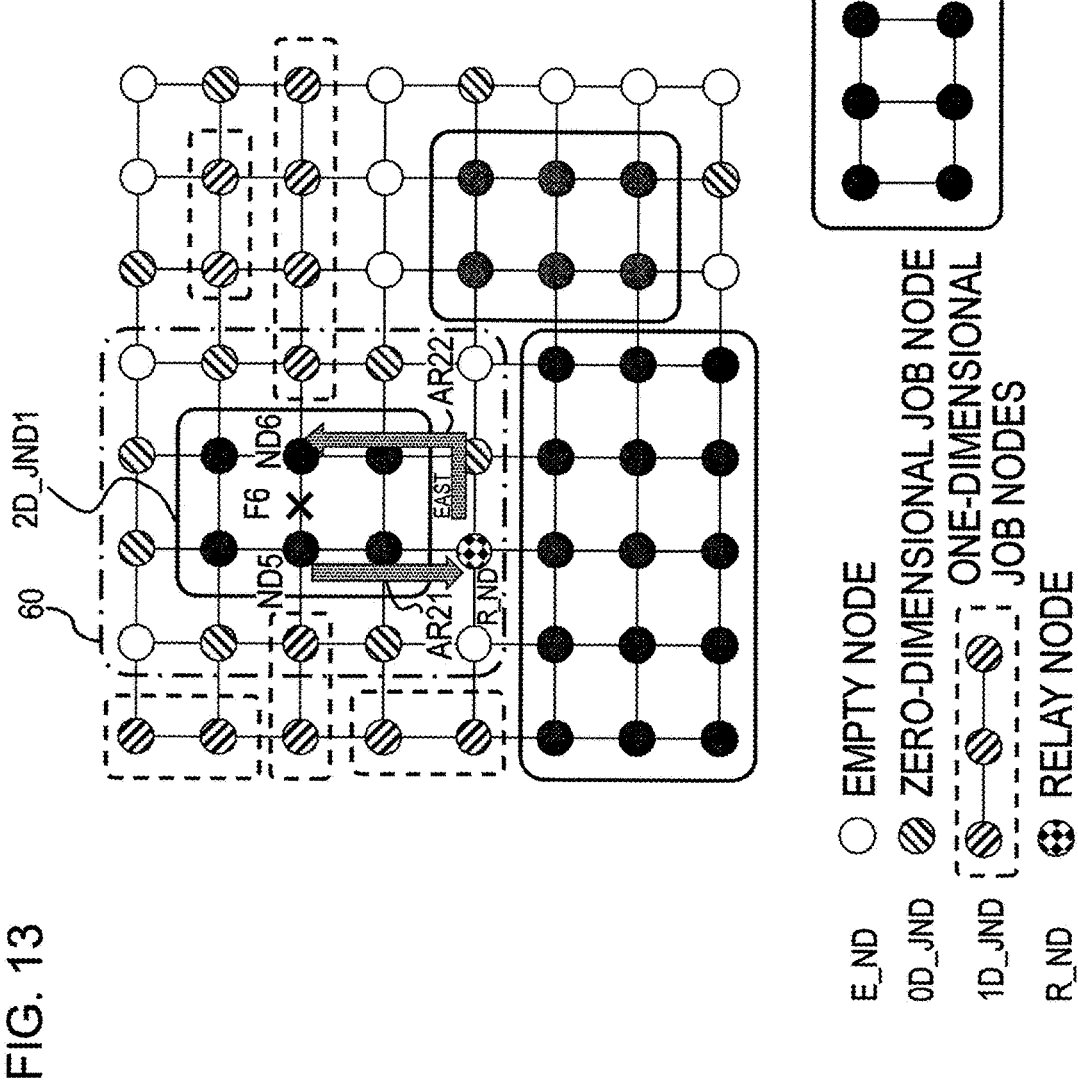
FIG. 13 is a diagram depicting an example of the second alternative route in this embodiment.

FIG. 13 is a diagram depicting an example of the second alternative route in this embodiment. As depicted in FIG. 13, it is assumed that the failure F6 occurs in the center link in the two-dimensional job nodes 2D_JND1. In this case, it is theoretically possible to establish, in the two-dimensional job nodes 2D_JND1, an alternative route for the communication route from the node ND5 to the node ND6 under the West-fast-turn routing. However, packets of messages are frequently propagated in the two-dimensional job nodes 2D_JND1. Therefore, it is sometimes undesirable to set an alternative route anew because, for example, a deadlock occurs in such alternative route.

Therefore, in the example depicted in FIG. 13, the control device 50 allocate an empty node in the peripheral region to the relay node R_ND and establishes a first alternative route AR21 that reaches the relay node R_ND from the start node ND5 and a second alternative route AR22 that reaches the end node ND6 from the relay node R_ND.

Figure 14:
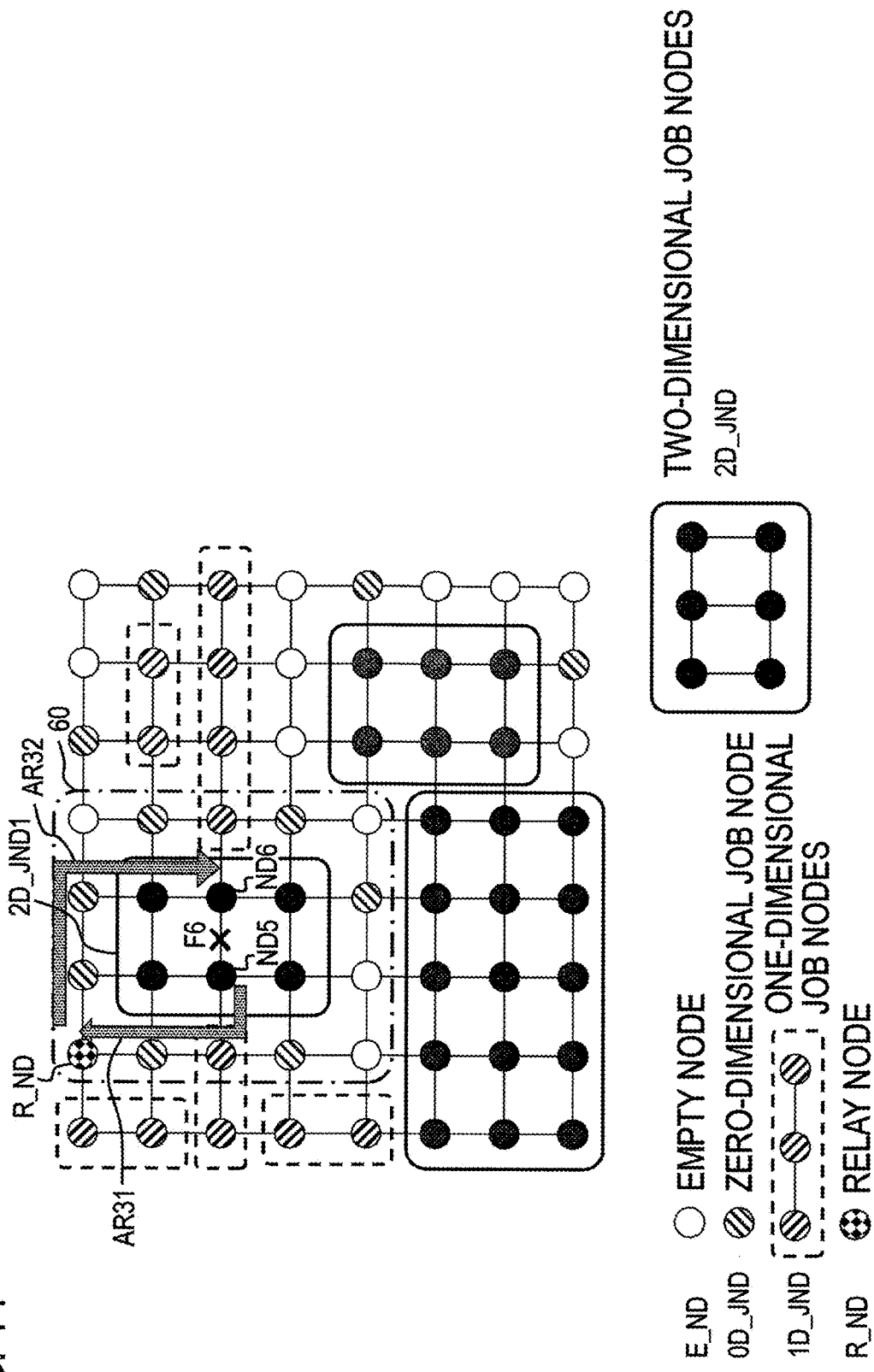
FIG. 14 is a diagram depicting an example of a third alternative route in this embodiment.

FIG. 14 is a diagram depicting an example of a third alternative route in this embodiment. In the example depicted in FIG. 14, the control device 50 allocates an empty node in the peripheral region to the relay node R_ND and establishes a first alternative route AR31 that reaches the relay node R_ND from the start node ND5 and a second alternative route AR32 that reaches the end node ND6 from the relay node R_ND.

As an alternative route for the communication route that reaches the end node ND6 from the start node ND5, several routes are conceivable other than the alternative routes explained above. By setting the relay node in the peripheral region, it is possible to dividedly perform routing from a start coordinate to an end coordinate a plurality of times. Therefore, possibility of establishing the alternative route increases.

According to the setting of the alternative route in this embodiment, the alternative route mainly passes the peripheral region of the two-dimensional job nodes 2D_JND1 allocated with the important job. Therefore, an extra burden is less likely to be imposed on the router in the two-dimensional job nodes, and the routing of a packet that is not affected by a failure location and is not needed to be bypassed is less likely to be hindered.

The relay node R_ND is desirably allocated to the empty node E_ND. However, if there is an empty core in the processor of the zero-dimensional job node or the node at the side with the one node length of the one-dimensional job nodes, the relay node can be allocated to the above nodes.

Since the relay node R_ND is desirably allocated to the empty node E_ND, it is desirable to perform job allocation such that the number of empty nodes in the peripheral region is larger than the minimum number needed. Therefore, the control device 50 may allocate empty nodes at a fixed ratio with respect to the number of failure locations of the two-dimensional job nodes 2D_JND of the important job. As this ratio, a reference value serving as a standard may be found by a simulation or the like in advance.

Figure 15:
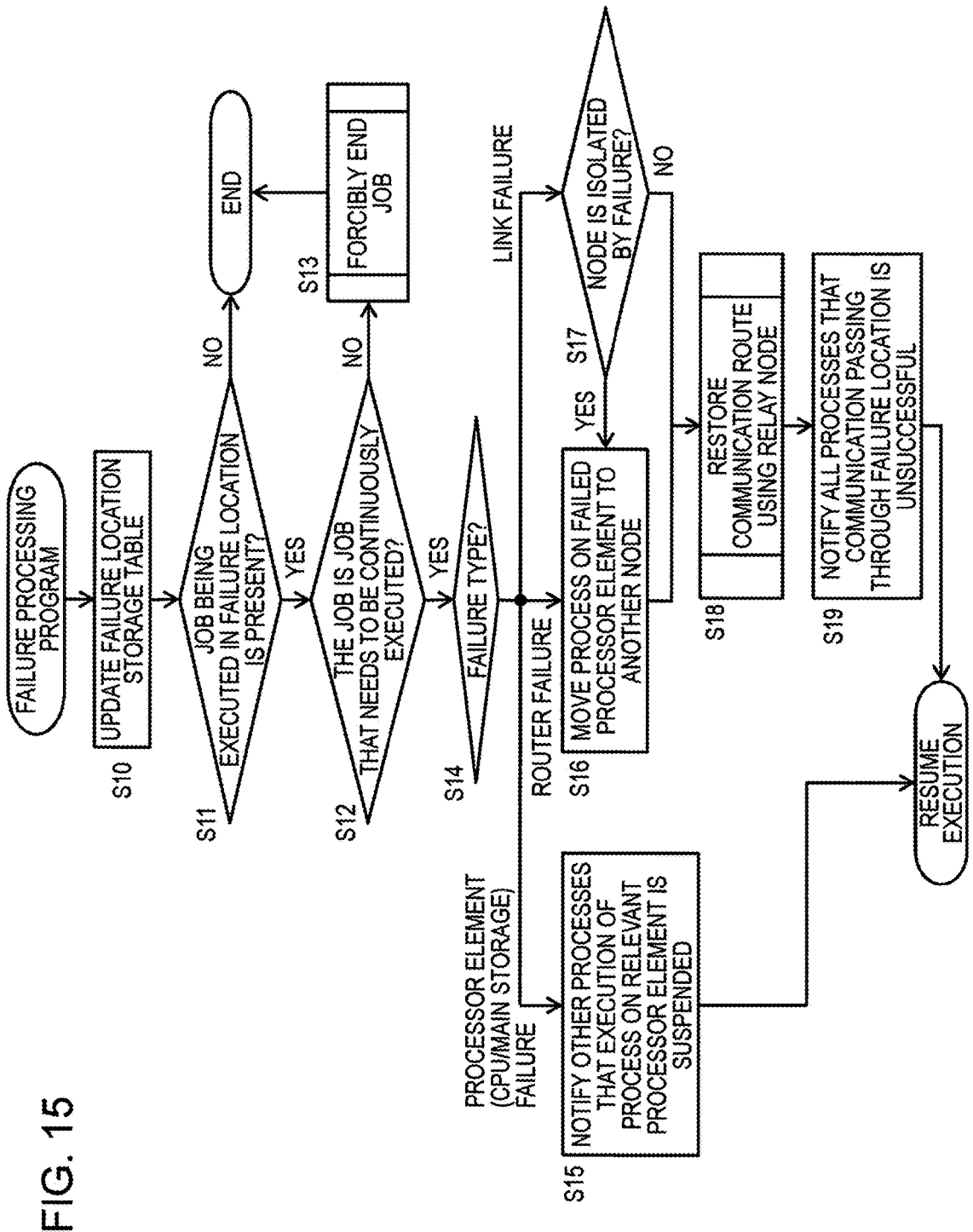
FIG. 15 is a flowchart of the failure processing in this embodiment.

FIG. 15 is a flowchart of the failure processing in this embodiment. The processor CPU of the control device 50 executes the failure processing program 52-2 and performs failure processing explained below. When receiving a failure detection notification from the failure detecting devices 43 provided in the nodes, the control device 50 registers a failure location of the failure and content of the failure in the failure location storage table 52-5 (S10). The control device 50 refers to the job execution node storage table 52-4 and checks whether there is a job being executed in the failure occurrence location (S11). If there is the job being executed in the failure occurrence location (YES in S11) and if the job is an important job that, for example, needs to be continuously executed (YES in S12), according to a failure type (S14), the control device 50 executes failure processing corresponding to the failure type.

When the failure location is the processor 40 or the main storage device 41 (a processor element PE) in the node, the control device 50 notifies the other processes that execution of the job by the processor in failure location is suspended (S15). In this case, the user copes with the failure through user-level failure mitigation (ULFM).

When the failure location is a failure of the router in the node, the control device 50 moves a process on the processor in the failure location to another node (S16). The movement to the other node is desirably performed through, for example, another network 51 different from the node connection network in the control device 50. When the failure location is a failure of the link, if the node is isolated because of the failure of the link (YES in S17), it may be impossible to continue a process by the node. Therefore, the control device 50 moves the process on the processor of the isolated node to another node (S16).

When the failure location is a router failure or a link failure, a hindrance sometimes occurs in a transmission route of a message among the nodes. Therefore, the control device 50 sets the relay node in the peripheral region of the two-dimensional job nodes in which the failure occurs, determines an alternative route using the relay node, and restores the communication route (S18). The control device 50 notifies all the processes that message communication passing the failure location is unsuccessful (S19). Consequently, information concerning the failure location is also notified to all the processes, that is, the node executing the job.

Figure 16:
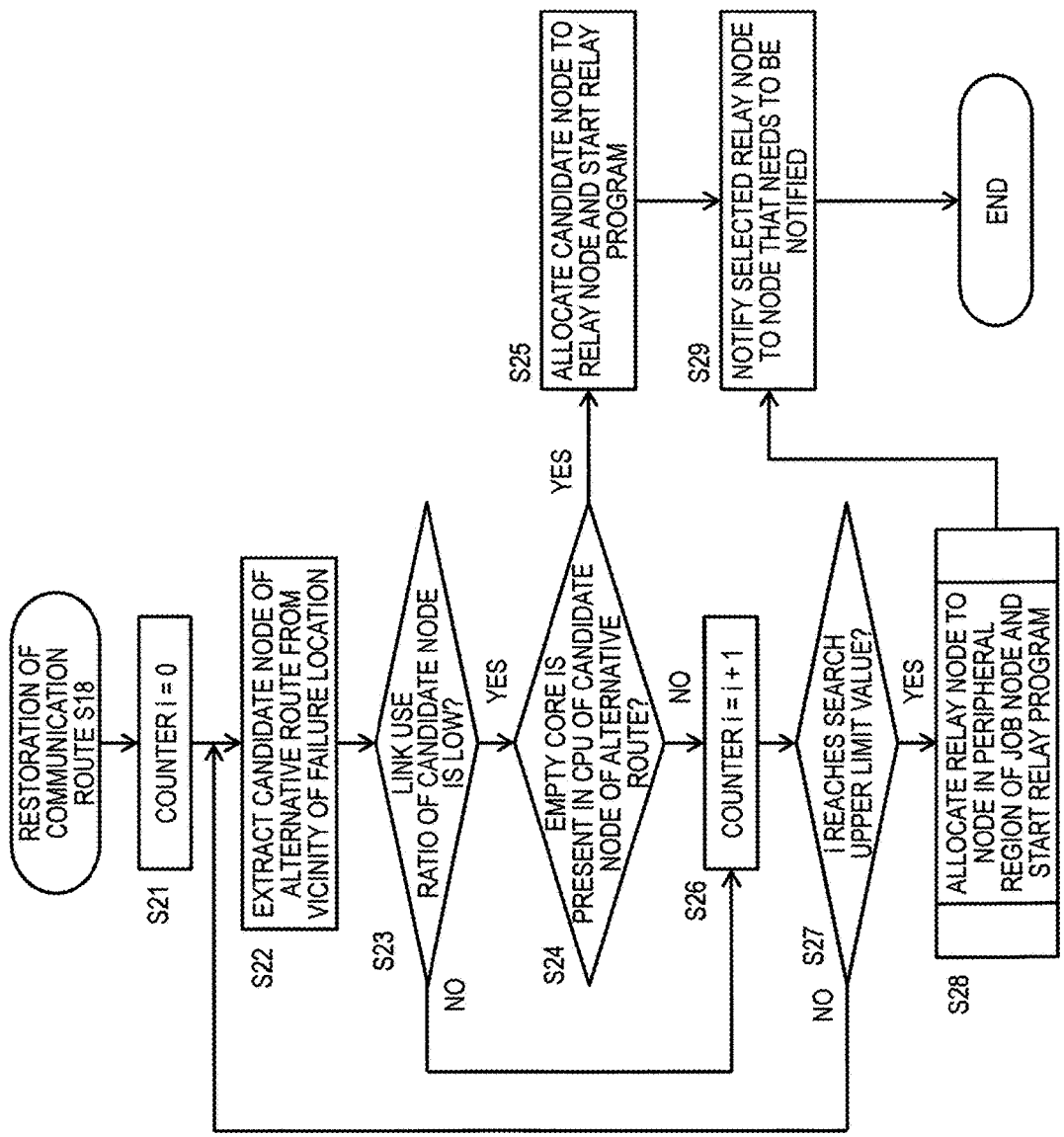
FIG. 16 is a flowchart of the processing S18 of the restoration of the communication route in FIG. 15.

FIG. 16 is a flowchart of the processing S18 of the restoration of the communication route in FIG. 15. The control device 50 establishes, in the failure processing, an alternative route for the communication route interrupted by the failure and restores the communication route. In that case, first, the control device 50 searches for a node appropriate as a relay node out of the nodes in the two-dimensional job nodes of the important job (S21 to S27). When an appropriate node is not found, the control device 50 searches for the node appropriate as the relay node out of the nodes in the peripheral region of the two-dimensional job nodes (S28).

The control device 50 extracts a candidate node of the alternative route from the vicinity of the failure location (S22) until a counter i reaches an upper limit value (S21 and S27). If a link use ratio of the candidate node is low (YES in S23) and if there is an empty core in the CPU of the candidate node (YES in S24), the control device 50 allocates the candidate node to the relay node and installs and starts a relay program (S25). By appropriately setting the upper limit value, according to the processing explained above, the control device 50 at first detects the node appropriate as the relay node in the nodes in the region of the two-dimensional job nodes in which the failure occurs.

If the node appropriate as the relay node is not found in the nodes in the region of the two-dimensional job nodes in which the failure occurs (YES in S27), the control device 50 searches for the node appropriate as the relay node out of the nodes in the peripheral region of the two-dimensional job nodes (S28). This search processing is explained with reference to FIG. 17.

After allocating the relay node to any of the nodes, the control device 50 notifies a coordinate of the selected relay node to a node that needs to be notified such as a node, the communication route to which is interrupted (S29). Consequently, the notified node resumes the transmission of the message using an alternative route passing through the relay node set anew.

Figure 17:
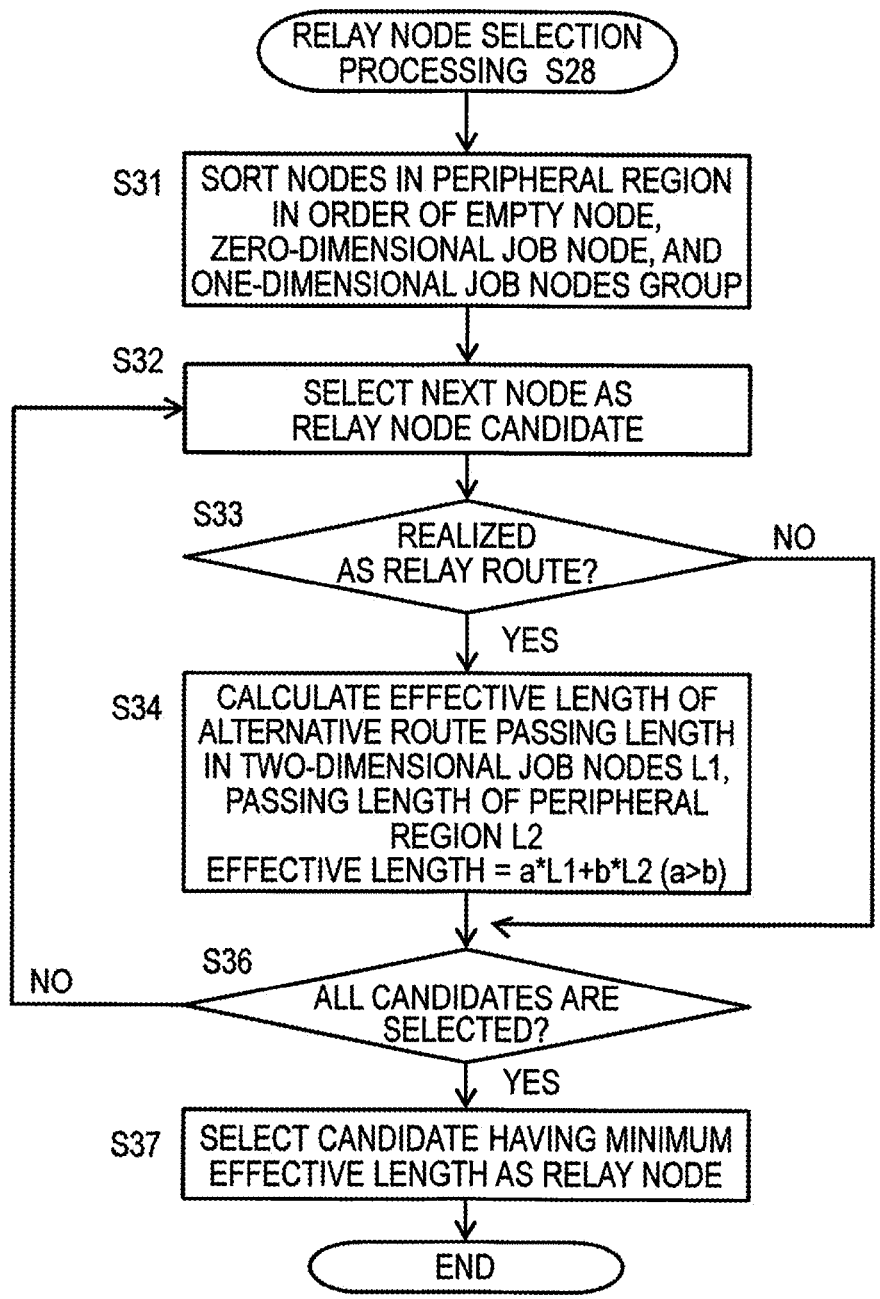
FIG. 17 is a flowchart of the selection processing for the relay node in the peripheral region in the processing S28 in FIG. 16.

FIG. 17 is a flowchart of the selection processing for the relay node in the peripheral region in the processing S28 in FIG. 16. The control device 50 sorts the nodes in the peripheral region in the order of the empty node, the zero-dimensional job node, and the node of the one-dimensional job nodes (S31). The control device 50 selects a sorted first node (or, in the second time, the next node) as a relay node candidate (S32) and checks whether the relay node candidate is realized as a relay route of an alternative route (S33). This check of realizability is a check for determining whether an alternative route can be established for a predicted failure location. If a probability of realization is equal to or greater than a fixed value, the control device 50 determines that the relay node candidate is realized as the relay router of the alternative route. If the relay node candidate is realized as the relay router of the alternative route (YES in S33), the control device 50 calculates effective length of the alternative route (S34). The effective length of the alternative route is calculated by the following formula with respect to passing length L1 in the two-dimensional job node of the important job and passing length L2 of the peripheral region.

$$\text{Effective length of the alternative route} = a*L1 + b*L2$$

where, a and b are weight values and a>b.

That is, the effective length of the alternative route is larger when the alternative route passes a node in the two-dimensional job nodes and is smaller when the alternative route passes the peripheral region. Therefore, the effective length is reduced if the alternative route includes as small number of passing nodes as possible and includes as many nodes passing the peripheral region as possible.

The control device 50 applies the selection of the relay node candidate (S32), the determination of the realizability as the relay route (S33), and the calculation of the effective length (S34) to all candidates and selects a candidate having the smallest effective length as the relay node. If the effective lengths are the same, the empty node is preferentially selected as the relay node.

In the calculation formula of the effective length of the alternative route, if the candidate node is the empty node, the weight value b may be set smaller. If the candidate node is the zero-dimensional job node or the one-dimensional job nodes, the weight value b may be set larger. Consequently, it is possible to make the empty node to be easily selected as the relay node.

[Routing of the Alternative Route through the Relay Node]

Figure 18:
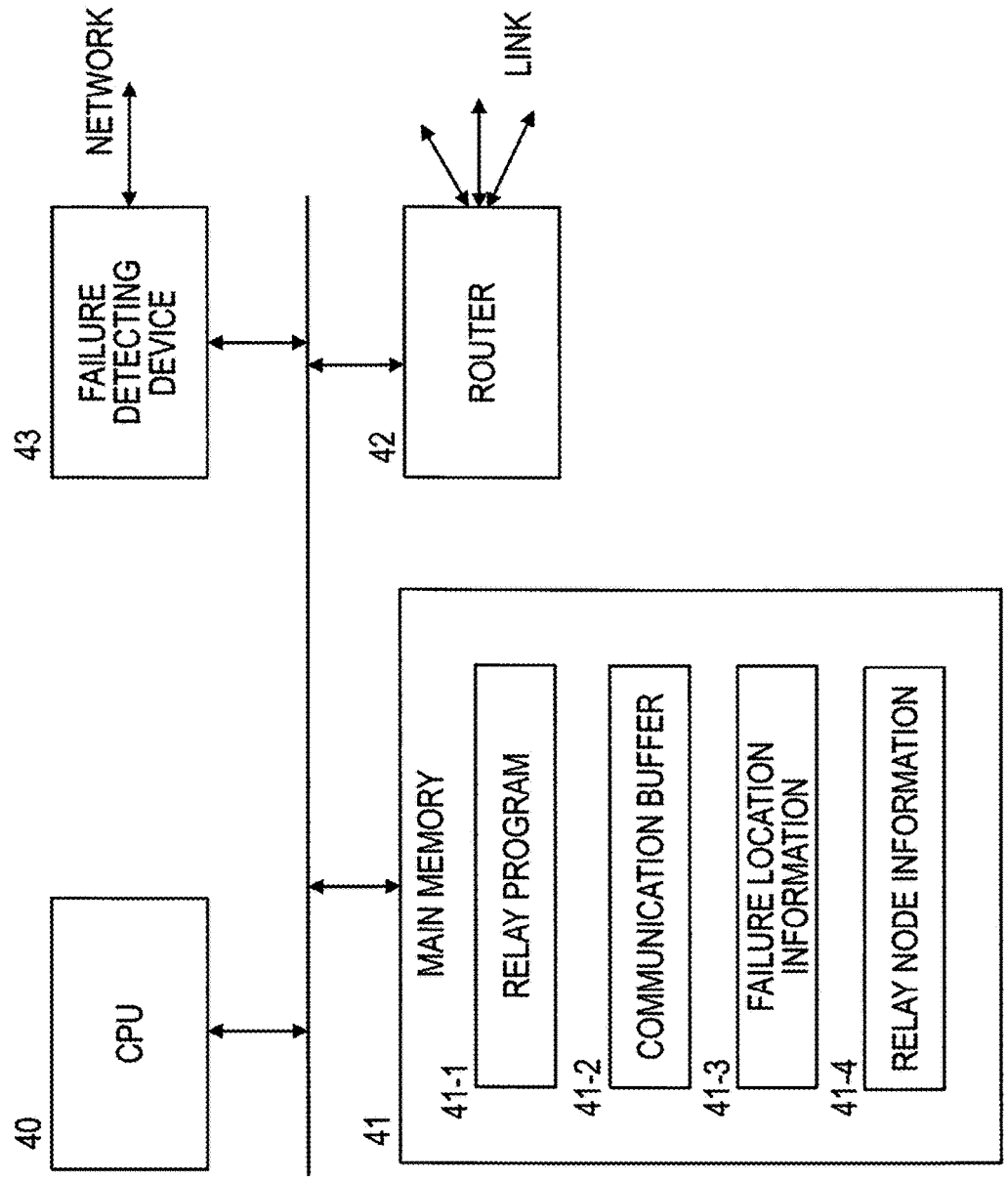
FIG. 18 is a diagram depicting the configuration of the relay node.

FIG. 18 is a diagram depicting the configuration of the relay node. Like the normal node depicted in FIG. 5, the relay node includes the processor 40, the main storage device 41, the router 42, and the failure detecting device 43. In the main storage device 41, a relay program 41-1, a communication buffer 41-2 that temporarily stores a received packet, and failure location information 41-3 are stored. However, relay node information 41-4 is not stored in the memory of the relay node.

On the other hand, in the normal node, in the main storage device 41, a communication program is stored instead of the relay program 41-1. The relay node information 41-4 is also stored in addition to the failure location information 41-3.

The processor 40 of the relay node R_ND executes the relay program 41-1, functions as an end node to receive a packet transmitted by a start node, and stores the packet in the communication buffer 41-2. In a header of the received packet, a coordinate of the start node is stored as a start coordinate and a coordinate of the relay node is stored as an end coordinate. Further, the processor 40 of the relay node executes the relay program 41-1, changes the start coordinate in the header of the received packet to the coordinate of the relay node and changes the end coordinate to the coordinate of the end node, and routes the packet again. As explained below, information concerning the start coordinate, the relay coordinate, and the end coordinate is included in a data region of the packet.

Figure 19:
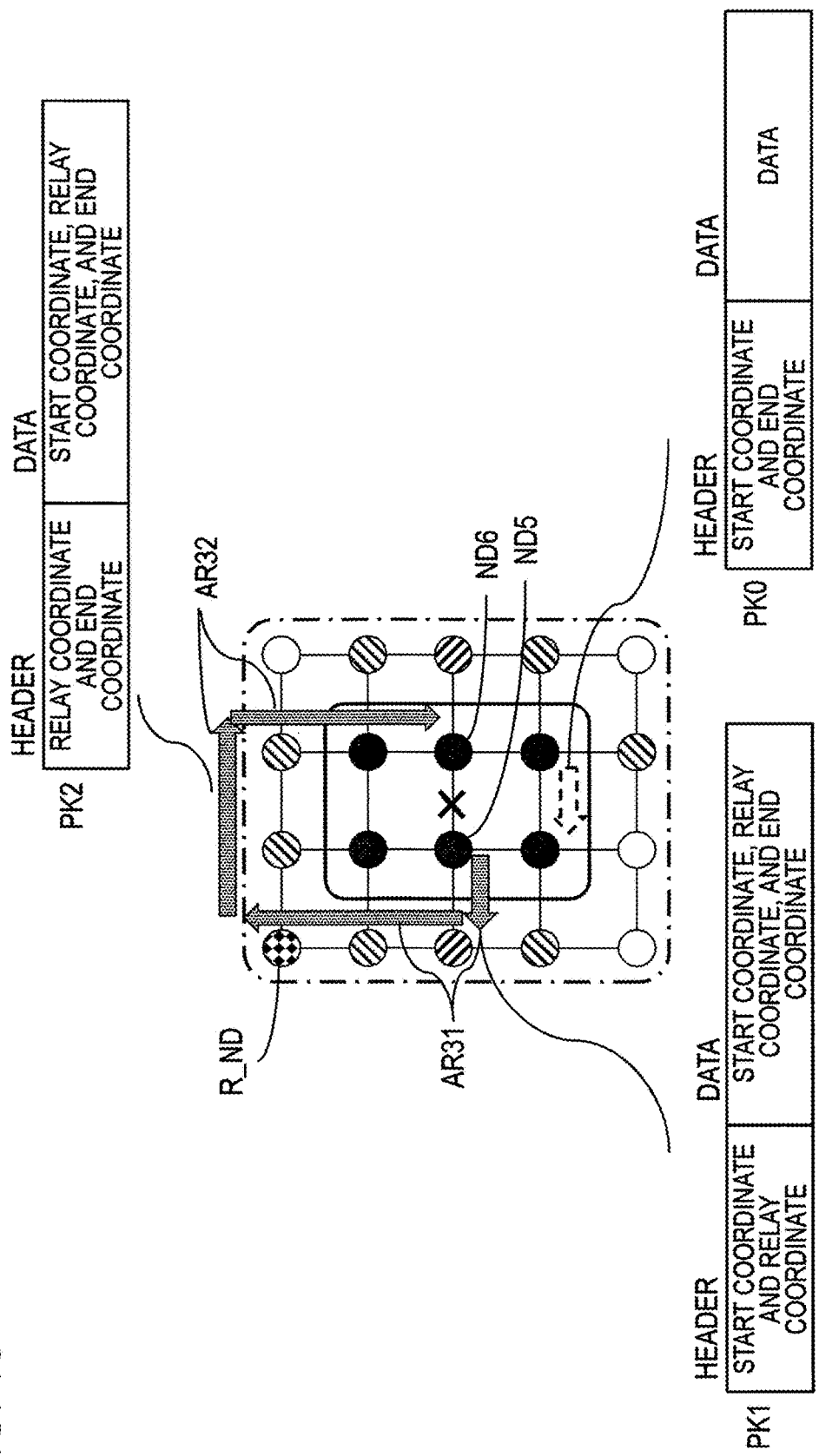
FIG. 19 is a diagram for explaining the routing of the alternative route through the relay node.

FIG. 19 is a diagram for explaining the routing of the alternative route through the relay node. In FIG. 19, in a packet transmitted not through the relay node as indicated by a broken line arrow, a start coordinate and an end coordinate are stored in a header and a message is stored in a data region. The router of the node through which the packet is transmitted routes the packet to the next node on the basis of the start coordinate, links through which the packet is transmitted, and the end coordinate, and on the basis of a routing rule. Therefore, hardware of the router of the via node can determine the direction of the routing on the basis of header information of the packet.

On the other hand, the alternative routes AR31 and AR32 depicted in FIG. 19 are the same as the alternative routes AR31 and AR32 depicted in FIG. 14. The alternative route depicted in FIG. 19 include the first alternative routes AR31 from the start node ND5 to the relay node R_ND and the second alternative route AR32 from the relay node R_ND to the end node ND6. The processor of the start node ND5 searches for an alternative route that reaches the end node ND6 through the relay node R_ND. The processor of the start node ND5 stores the coordinate of the start node ND5 in the header region of the packet as the start coordinate, stores the coordinate of the relay node R_ND in the header region as the end coordinate, stores information concerning the start coordinate, the relay coordinate, and the end coordinate in the data region of the packet, and transmits the packet. The transmitted packet is subjected to routing processing by normal hardware based on the start coordinate and the end coordinate in the header by the router of the via node halfway in the first alternative route AR31 and delivered to the relay node R_ND.

The processor of the relay node R_ND executes the relay program 41-1 and temporarily stores the received packet in the communication buffer. The processor executes the relay program 41-1, refers to the start coordinate, the relay coordinate, and the end coordinate in the data region of the temporarily-stored packet, writes the coordinate of the relay node in the start coordinate in the header of the buffered packet, writes the coordinate of the end node in the end coordinate in the header, and transmits the packet, the header information of which is changed, to the second alternative route AR32. Consequently, the routing processing based on the start coordinate and the end coordinate in the header is performed by the route of the via node halfway in the second alternative route AR32. The packet is delivered to the end node ND6.

As explained above, in the relay node R_ND, the relay program is installed and started. Therefore, rather than performing the normal routing as a via router, the relay node R_ND generates a packet to be transmitted and routes the generated packet anew, like a start node. Therefore, even under the limitation of the routing, by transmitting the packet through the relay node, it is possible to restore the communication route interrupted by the failure using the alternative route bypassing the failure location.

[Example of a Node Arranged in a Peripheral Region of the Three-Dimensional Job Node]

Figure 20:
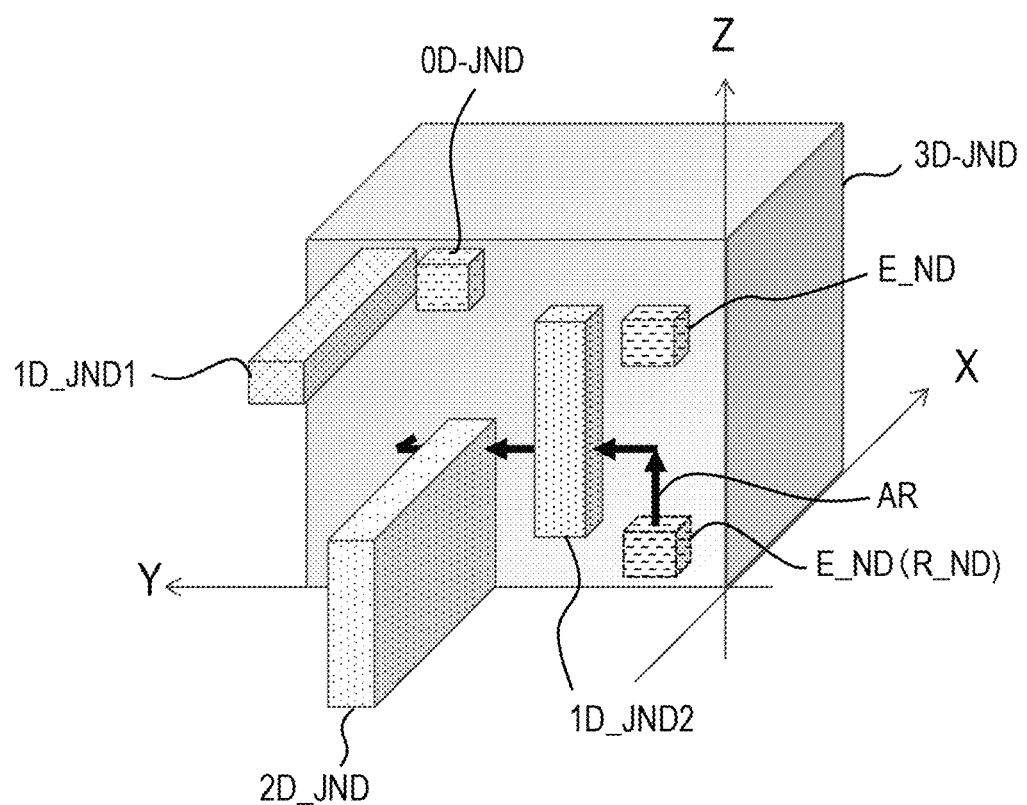
FIG. 20 is a diagram depicting an example of a node arranged in a peripheral region of the three-dimensional job nodes.

FIG. 20 is a diagram depicting an example of a node arranged in a peripheral region of the three-dimensional job nodes. In job arrangement processing, the control device in this embodiment arranges the empty node E_ND and the zero-dimensional job node 0D_JND in a peripheral region in contact with a YZ plane of the three-dimensional job nodes 3D_JND of the important job. Further, as depicted in FIG. 20, the long side of the one-dimensional job nodes 1D_JND and the long side of the two-dimensional job nodes 2D_JND may be arranged in contact with the YZ plane of the three-dimensional job nodes 3D_JND of the important job.

A reason for the above is as explained below. As the alternative route AR, assuming a route that starts from a node inside the three-dimensional job nodes 3D_JND, passes through the empty node E_ND arranged in the peripheral region on the YZ plane as the relay node R_ND, and reaches a node inside the three-dimensional job nodes 3D_JND from the relay node. The alternative route AR proceeds in the Z-axis direction from the empty node E_ND set as the relay node R-ND, passes through a node in the one-dimensional job nodes 1D_JND2 and a node in the two-dimensional job nodes 2D_JND while proceeding in the Y-axis direction halfway, and then proceeds in the X-axis direction and reaches the node in the three-dimensional job nodes 3D_JND.

In this case, whereas the alternative route AR traverses the node in the one-dimensional job nodes 1D_JND2 in the Y-axis direction, the router of the node in the one-dimensional job nodes 1D_JND2 mainly routes a message in the Z-axis direction. Therefore, since the router of the node in the one-dimensional job nodes 1D_JND2 has enough room concerning the routing in the Y-axis direction, even if the alternative route AR traverses in the Y-axis direction and the message on the alternative route passes, routing of the message within the one-dimensional job nodes 1D_JND2 is less likely to be affected.

Similarly, the node in the two-dimensional job nodes 2D_JND routes the internal message limited in a ZX plane. Therefore, even if the alternative route AR traverses in the Y-axis direction and the message on the alternative route passes through the node of the two-dimensional job nodes 2D_JND in the Y-axis direction, routing of the message within the two-dimensional job nodes 2D_JND is less likely to be affected.

In this way, a node at a side or a surface with one node length of the two-dimensional job nodes 2D_JND or the one-dimensional job nodes 1D_JND may be arranged in the peripheral region of the YZ plane of the three-dimensional job nodes 3D_JND. In this case, an alternative route is provided in a one node length direction of the side or the surface with one node length.

As explained above, with the parallel computer system in this embodiment, any of the empty nodes not allocated with a job, the zero-dimensional job nodes allocated with the job, and nodes at a side or a surface with one node length of an M (M=<N or M<N)-dimensional job nodes allocated with the job are allocated to a peripheral region of an N-dimensional job nodes that executes an important job, for example, requested to be continuously executed. Therefore, it is possible to restore the communication route interrupted by the failure using the alternative route that passes through at least one node in the peripheral region as the relay node. Consequently, it is possible to avoid, as much as possible, stopping a job because of communication interruption of a message, allocating a job to a new region, and resuming the job.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel computer system comprising:
    a parallel computer including nodes connected via communication routes and configured to respectively execute calculations; and
    a control device configured to allocate a job to a predetermined number of nodes in the parallel computer, wherein
    the control device includes:
        a job allocation processor configured to allocate, to a peripheral region of first N-dimensional job nodes allocated with a first job, any of an empty node not allocated with a job, a zero-dimensional job node allocated with a job, and a node at a side or a surface with one node length of M-dimensional job nodes allocated with a job, N being equal to or greater than 1 and M being less than N; and
        a failure processor configured to, when a failure occurs in the first N-dimensional job nodes, allocate at least one node among the nodes in the peripheral region to a relay node, select a route passing through the relay node as an alternative route for a communication route in which communication is hindered by the failure, and execute communication among the nodes via the alternative route.

2. The parallel computer system according to claim 1, wherein the job allocation processor allocates the first N-dimensional job nodes to be adjacent to, via the peripheral region, second N-dimensional job nodes currently executing a second job.

3. The parallel computer system according to claim 2, wherein
    the communication route is a route that conforms to a routing rule and reaches an end node from a start node through a via node,
    the alternative route includes a first alternative route that reaches the relay node from the start node through a via node and a second alternative route that reaches the end node from the relay node through a via node,
    a packet transmitted by the start node is propagated through the first alternative route and reaches the relay node according to the routing rule, and
    a packet transmitted by the relay node is propagated through the second alternative route and reaches the end node according to the routing rule.

4. The parallel computer system according to claim 3, wherein
    the relay node buffers the received packet, rewrites a start coordinate and an end coordinate of the packet, and transmits the rewritten packet through the second alternative route, and
    the via node routes the propagated packet on the basis of the start coordinate and the end coordinate of the packet.

5. The parallel computer system according to claim 3, wherein a direction in which the packet is routed among nodes in the M-dimensional job nodes is different from a direction in which the packet propagated through the alternative route is routed in the node at the side or the surface with one node length of the M-dimensional job nodes.

6. The parallel computer system according to claim 1, wherein
    the communication route is a route that conforms to a routing rule and reaches an end node from a start node through a via node,
    the alternative route includes a first alternative route that reaches the relay node from the start node through a via node and a second alternative route that reaches the end node from the relay node through a via node,
    a packet transmitted by the start node is propagated through the first alternative route and reaches the relay node according to the routing rule, and
    a packet transmitted by the relay node is propagated through the second alternative route and reaches the end node according to the routing rule.

7. The parallel computer system according to claim 6, wherein
    the relay node buffers the received packet, rewrites a start coordinate and an end coordinate of the packet, and transmits the rewritten packet through the second alternative route, and the via node routes the propagated packet on the basis of the start coordinate and the end coordinate of the packet.

8. The parallel computer system according to claim 6, wherein a direction in which the packet is routed among nodes in the M-dimensional job nodes is different from a direction in which the packet propagated through the alternative route is routed in the node at the side or the surface with one node length of the M-dimensional job nodes.

9. The parallel computer system according to claim 1, wherein the failure processor of the control device allocates the empty node in the peripheral region to the relay node.

10. The parallel computer system according to claim 1, wherein the failure processing unit of the control device selects, as the relay node, a node through which an alternative route having minimum effective length passes through as the relay node, from the empty node, the zero-dimensional job node, and the node at the side or the surface with one node length of the M-dimensional job nodes.

11. The parallel computer system according to claim 1, wherein the job allocation processor of the control unit allocates, to the peripheral region, any of the zero-dimensional job node and the node at the side or the surface with one node length of the M-dimensional job nodes such that the number of the empty nodes in the peripheral region becomes a minimum value or more.

12. A control method of a parallel computer system including: a parallel computer including nodes connected via communication routes and configured to respectively execute calculations; and a control device configured to allocate a job to a predetermined number of nodes in the parallel computer, the control method comprising:
- causing the control device to allocate, to a peripheral region of first N-dimensional job nodes allocated with a first job, any of an empty node not allocated with a job, a zero-dimensional job node allocated with a job, and a node at a side or a surface with one node length of M-dimensional job nodes allocated with a job, N being equal to or greater than 1 and M being less than N; and
- causing the control device to, when a failure occurs in the first N-dimensional job node, allocate at least one node among the nodes in the peripheral region to a relay node, select a route passing through the relay node as an alternative route for a communication route in which communication is hindered by the failure, and execute communication among the nodes via the alternative route.

* * * * *